(12) United States Patent
Fukuroi et al.

(10) Patent No.: US 9,783,680 B2
(45) Date of Patent: Oct. 10, 2017

(54) PRODUCTION METHOD FOR FINE ORGANIC PIGMENT

(71) Applicant: KAO CORPORATION, Tokyo (JP)

(72) Inventors: Hironobu Fukuroi, Wakayama (JP); Takahiro Sato, Wakayama (JP); Isao Tsuru, Kinokawa (JP); Yusuke Shimizu, Misaki-cho (JP); Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/891,180

(22) PCT Filed: May 14, 2014

(86) PCT No.: PCT/JP2014/062890
§ 371 (c)(1),
(2) Date: Nov. 13, 2015

(87) PCT Pub. No.: WO2014/185475
PCT Pub. Date: Nov. 20, 2014

(65) Prior Publication Data
US 2016/0090483 A1    Mar. 31, 2016

(30) Foreign Application Priority Data

May 14, 2013   (JP) ................................ 2013-102204
Dec. 26, 2013  (JP) ................................ 2013-270407

(51) Int. Cl.
| | | |
|---|---|---|
| C09B 67/02 | (2006.01) | |
| C09B 67/00 | (2006.01) | |
| C09D 11/00 | (2014.01) | |
| C09B 67/46 | (2006.01) | |
| C09D 11/322 | (2014.01) | |
| C09B 67/20 | (2006.01) | |
| C09D 17/00 | (2006.01) | |

(52) U.S. Cl.
CPC ........ *C09B 67/0022* (2013.01); *C09B 67/006* (2013.01); *C09B 67/009* (2013.01); *C09B 67/0086* (2013.01); *C09B 67/0089* (2013.01); *C09D 11/00* (2013.01); *C09D 11/322* (2013.01); *C09D 17/003* (2013.01)

(58) Field of Classification Search
CPC ...... C09D 11/00; C09D 11/322; C09D 17/00; C09D 17/03; C09B 67/0022; C09B 67/006; C09B 67/0086; C09B 67/0089; C09B 67/009
See application file for complete search history.

(56) References Cited

U.S. PATENT DOCUMENTS

2006/0247347 A1   11/2006  Glos et al.
2007/0131144 A1   6/2007   Winter et al.
(Continued)

FOREIGN PATENT DOCUMENTS

DE   10 2005 021 160 A1   11/2000
DE   10 2005 019 747 B3    6/2006
(Continued)

OTHER PUBLICATIONS

Machine Translation of Japanese Patent Specification No. JP 2010-106260 A (May 2010).*
Extended European Search Report, dated Nov. 22, 2016, for European Application No. 14797611.2.
Emulgen 120 Kao Corp. Seihin Anzen Data Sheet, Kao Corp., Nov. 1, 2010, http://chemical.kao.com/jp/products/B0001920_jpja.html.
Emulgen 430 Kao Corp. Seihin Anzen Data Sheet, Kao Corp., Sep. 3, 2009, http://chemical.kao.com/jp/products/B0001953_jpja.html.
International Search Report, issued in PCT/JP2014/062890, dated Jul. 8, 2014.
U.S. Appl. No. 14/891,192, filed Nov. 13, 2015.
U.S. Appl. No. 14/891,156, filed Nov. 13, 2015.

*Primary Examiner* — Anthony J Green
(74) *Attorney, Agent, or Firm* — Birch, Stewart, Kolasch & Birch, LLP

(57) ABSTRACT

The present invention provides the following process for producing a fine organic pigment which is capable of producing the fine organic pigment that has a very small primary particle size and is excellent in filtering property even in a cleaning step, and a fine organic pigment produced by the process; a process for producing a dispersion using the fine organic pigment, and a dispersion produced by the process; and a process for producing an ink using the dispersion. The present invention relates to [1] a process for producing a fine organic pigment, including steps 1 and 2: step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass on the basis of 100 parts by mass of the raw material organic pigment:

$R^1O(PO)_m(EO)_nA$ (1); and step 2: subjecting the mixture obtained in the step 1 to cleaning treatment with an aqueous solvent and then to filtration, [2] a fine organic pigment produced by the process according to the above aspect [1], [3] a dispersion produced using the fine organic pigment according to the above aspect [2], [4] a process for producing a paste of a fine organic pigment, including the above step 1 and 2, [5] a process for producing a dispersion, including step 3 of subjecting the paste of the fine organic pigment produced by the process according to the above aspect [4], an organic solvent and water to dispersing treatment, and [6] a process for producing an ink, including step 4 of mixing the dispersion produced by the process according to the above aspect [5] with at least one material selected from the group consisting of water and an organic solvent.

17 Claims, No Drawings

(56) References Cited

U.S. PATENT DOCUMENTS

2009/0305156 A1    12/2009   Weber et al.
2010/0021701 A1     1/2010   Heinrichs

FOREIGN PATENT DOCUMENTS

| DE | 10 2006 034 240 A1 | 1/2008 |
|----|----|----|
| JP | 63-248864 A | 10/1988 |
| JP | 2003-57425 A | 2/2003 |
| JP | 2007-293061 A | 11/2007 |
| JP | 2009-221376 A | 10/2009 |
| JP | 2010-106260 A | 5/2010 |
| JP | 2010-163501 A | 7/2010 |
| JP | 2011-252123 A | 12/2011 |
| JP | 2012-25920 A | 2/2012 |
| WO | WO 2005/042642 A1 | 5/2005 |

\* cited by examiner

PRODUCTION METHOD FOR FINE ORGANIC PIGMENT

FIELD OF THE INVENTION

The present invention relates to a process for producing a fine organic pigment, and a fine organic pigment produced by the process; a process for producing a dispersion using the fine organic pigment, and a dispersion produced by the process; and a process for producing an ink using the dispersion.

BACKGROUND OF THE INVENTION

In ink-jet printing methods, droplets of ink are projected onto a recording medium from very fine nozzles and allowed to adhere to the recording medium to obtain printed matters on which characters, images, etc., are printed. The printed matters are required to have high optical density and gloss, whereas the inks for ink-jet printing are required to have a high ejection property. In addition, color filters for liquid crystal displays are required to exhibit high contrast ratio and brightness. Therefore, pigments used in the inks for ink-jet printing and color filters are in the form of fine pigment particles having a very small primary particle size.

As the method of obtaining a fine organic pigment by reducing a primary particle size of an organic pigment as a raw material, there are extensively used wet kneading and milling methods such as solvent salt milling, dry milling methods, etc. The solvent salt milling means a milling method of atomizing a powder, etc., by a wet kneading method using a water-soluble inorganic salt as pulverization media. For example, by mechanically kneading the raw material organic pigment and the water-soluble inorganic salt together with a water-soluble organic solvent, it is possible to pulverize the pigment and reduce a primary particle size of the pigment.

Patent Literature 1 discloses a process for producing a fine organic pigment, including the step of kneading a mixture of a raw material organic pigment, a milling aid and a water-soluble organic solvent by a solvent salt milling method, in which the kneading is conducted in the presence of an organic substance containing a specific organic acid metal salt.

Patent Literature 2 discloses a process for producing a pigment composition having excellent gloss and stability, in which a crude phthalocyanine pigment is subjected to a wet milling treatment in the presence of a phosphoric acid ester or a sulfuric acid ester of a polyethylene glycol monoether.

CITATION LIST

Patent Literature

Patent Literature 1: JP 2011-252123A
Patent Literature 2: JP 63-248864A

SUMMARY OF THE INVENTION

The wet kneading method such as, typically, solvent salt milling is a useful method for pulverizing a pigment. As the primary particle size of the resulting organic pigment is reduced, the ink for ink-jet printing or color filter using the organic pigment can be further improved in properties thereof. Therefore, there is an increasing demand for methods for producing organic pigments having a smaller primary particle size.

On the other hand, even when the pigment having a very small primary particle size can be obtained by the conventional kneading method, there tends to occur such a problem that the mixture obtained after kneading causes clogging of a filter owing to the small primary particle size of the pigment upon cleaning the mixture with an aqueous solvent, which results in remarkable deterioration in productivity in the cleaning step. The processes disclosed in Patent Literatures 1 and 2 have failed to solve these conventional problems.

According to the present invention, there are provided a process for producing a fine organic pigment which is capable of producing the fine organic pigment having a very small primary particle size, and is excellent in filtering property even in a cleaning step, and a fine organic pigment produced by the process; a process for producing a dispersion using the fine organic pigment, and a dispersion produced by the process; and a process for producing an ink using the dispersion.

The present inventors have found that by kneading the mixture using a predetermined amount of the compound represented by the formula (1) in the following step 1, it is possible to obtain the fine organic pigment having a very small primary particle size which is excellent in filtering property even in the cleaning step.

That is, the present invention relates to the following aspects [1] to [6].

[1] A process for producing a fine organic pigment, including steps 1 and 2:

step 1: kneading a mixture prepared by compounding a raw material organic pigment, a water-soluble inorganic salt, a water-soluble organic solvent and a compound represented by the formula (1) with each other, the compound being compounded in an amount of not less than 0.8 part by mass and not more than 18.0 parts by mass, on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration.

[2] A fine organic pigment produced by the process according to the above aspect [1].

[3] A dispersion produced using the fine organic pigment according to the above aspect [2].

[4] A process for producing a paste of a fine organic pigment, including the above step 1 and 2.

[5] A process for producing a dispersion, including step 3 of subjecting the paste of the fine organic pigment produced by the process according to the above aspect [4], an organic solvent and water to dispersing treatment.

[6] A process for producing an ink, including step 4 of mixing the dispersion produced by the process according to the above aspect [5] with at least one material selected from the group consisting of water and an organic solvent.

In accordance with the present invention, there are provided a process for producing a fine organic pigment which is capable of producing the fine organic pigment that has a very small primary particle size and is excellent in filtering property even in a cleaning step, and a fine organic pigment produced by the process; a process for producing a dispersion using the fine organic pigment, and a dispersion produced by the process; and a process for producing an ink using the dispersion.

DETAILED DESCRIPTION OF THE INVENTION

The present invention relates to a process for producing a fine organic pigment, including step 1 of kneading a mixture prepared by compounding a raw material organic pigment, a water-soluble inorganic salt, a water-soluble organic solvent and a compound represented by the aforementioned formula (1) (hereinafter also referred to as a "compound (1)") with each other (the mixture is hereinafter also referred to as a "mixture to be kneaded"), and step 2 of subjecting the mixture obtained in the step 1 to cleaning treatment with an aqueous solvent and then to filtration. In the process for producing a fine organic pigment according to the present invention, it is possible to produce a fine organic pigment having a very small primary particle size, and attain the effect of allowing the resulting pigment to exhibit an excellent filtering property even in a cleaning step.

The mechanism of attaining the effects of the present invention is estimated as follows though details thereof have not been clearly determined yet. That is, the compound represented by the formula (1) is easily adsorbed onto the pigment, and has a structure with high water solubility. More specifically, when compounding the compound represented by the formula (1) in the step (1), the compound is adsorbed onto the pigment in the water-soluble organic solvent to deaggregate the pigment, so that atomization of the pigment can be promoted. On the other hand, a large amount of the aqueous solvent is mixed in the step 2, so that the compound having a high affinity to the aqueous solvent is desorbed from the pigment and transferred into the aqueous solvent in a manner contrary to the step 1. For this reason, the pigment is aggregated while maintaining a fine primary particle size thereof, and therefore occurrence of clogging during filtration upon cleaning the pigment can be eliminated. Owing to the synergistic effect of these steps, it is possible to produce an organic pigment having a fine primary particle size with high productivity. However, the above discussion is merely estimation, and the present invention is therefore not particularly limited thereto.

[Raw Material Organic Pigment]

The raw material organic pigment used in the present invention means an organic pigment before being kneaded.

As the raw material organic pigment, there is preferably used at least one pigment selected from the group consisting of condensed polycyclic pigments such as anthraquinone pigments, quinacridone pigments, indigo pigments, dioxazine pigments, perylene pigments, perinone pigments, isoindolinone pigments, isoindoline pigments, quinophthalone pigments and diketopyrrolopyrrole pigments, and azo pigments such as disazo pigments, benzimidazolone pigments and condensed azo pigments. Of these organic pigments, from the viewpoints of good pulverization efficiency of the pigment and usefulness of the resulting fine organic pigment, more preferred is at least one pigment selected from the group consisting of quinacridone pigments, diketopyrrolopyrrole pigments, disazo pigments and benzimidazolone pigments.

The raw material organic pigment used in the present invention preferably contains an oxygen atom and a nitrogen atom bonded to a hydrogen atom in a molecule thereof, from the viewpoint of more remarkably attaining the effects of the present invention as well as the effect of addition of the below-mentioned water-soluble basic compound.

As the nitrogen atom bonded to a hydrogen atom which is contained in the raw material organic pigment, there may be mentioned nitrogen atoms contained in at least one functional group selected from the group consisting of an amino group of a primary amine, a secondary amine, etc., an amide group and an imide group. Of these nitrogen atoms, from the viewpoint of more efficiently exhibiting the effects of the present invention, preferred is the nitrogen atom contained in an amino group, and more preferred is the nitrogen atom contained in a secondary amine. As the oxygen atom contained in the raw material organic pigment, there may be mentioned the oxygen atom contained in ethers, esters, amides, ketones, aldehydes, etc. Of these oxygen atoms, from the viewpoint of more efficiently exhibiting the effects of the present invention, preferred is the oxygen atom contained in ketones. Also, from the viewpoint of suppressing deterioration in atomization effects owing to formation of a strong hydrogen bond, the raw material organic pigment more preferably contains no amide group.

As the raw material organic pigment used in the present invention, there is preferably used at least one pigment selected from the group consisting of quinacridone pigments and diketopyrrolopyrrole pigments. Of these organic pigments, from the viewpoint of more efficiently exhibiting the effects of the present invention, preferred are quinacridone pigments. It is estimated that quinacridone contains a ketone group and a secondary amino group, but both the functional groups are not adjacent to each other and no amide group is contained therein, so that formation of a strong hydrogen bond therein is prevented, and therefore the atomization effects of the present invention can be more efficiently exhibited.

As the quinacridone pigments, there may be mentioned at least one pigment selected from the group consisting of C.I.P.V. 19 (unsubstituted quinacridone), C.I.P.R. 122 (2,9-dimethyl quinacridone), C.I.P.R. 202 (2,9-dichloroquinacridone), C.I.P.R. 206 (solid solution of quinacridone quinone and unsubstituted quinacridone), C.I.P.R. 207 (solid solution of 4,11-dichloroquinacridone and unsubstituted quinacridone), C.I.P.R. 209 (3,10-dichloroquinacridone), C.I.P.O. 48 (solid solution of quinacridone quinone and unsubstituted quinacridone), C.I.P.O. 49 (solid solution of quinacridone quinone and unsubstituted quinacridone), C.I.P.V. 42 (quinacridone solid solution), C.I.P.O. 49 (solid solution of quinacridone quinone and unsubstituted quinacridone), "CROMOPHTHAL Jet 2BC" (quinacridone solid solution) available from Ciba Specialty Chemicals Corporation, and "FASTGEN SUPER MAGENTA RY" (quinacridone solid solution) available from DIC Corporation.

The primary particle size of the raw material organic pigment is preferably not more than 500 nm, more preferably not more than 300 nm and even more preferably not more than 150 nm, from the viewpoint of good pulverization efficiency. Also, the primary particle size of the raw material organic pigment is preferably not less than 30 nm, more preferably not less than 45 nm, and even more preferably not less than 60 nm, from the same viewpoint as described above. The primary particle size of the raw material organic pigment may be measured by the method described in Examples below.

[Pigment Derivative]

The mixture to be kneaded may also contain various pigment derivatives. The pigment derivatives are preferably in the form of a derivative of a compound constituting the raw material organic pigment. Examples of a substituent group contained in the pigment derivatives include a hydroxyl group, a carboxy group, a carbamoyl group, a sulfo group, a sulfonamide group and a phthalimidomethyl group. In addition, the pigment derivatives also include aromatic polycyclic compounds generally having no unit structure of organic pigments, such as naphthalene compounds and anthraquinone compounds. These pigment derivatives may be used alone or in combination of any two or more thereof.

The content of the pigment derivatives in the mixture to be kneaded is preferably not less than 0.05 part by mass and more preferably not less than 0.1 part by mass on the basis of 100 parts by mass of the raw material organic pigment, from the viewpoint of good dispersibility and atomization of the pigment, and is also preferably not more than 5 parts by mass, more preferably not more than 1 part by mass and even more preferably not more than 0.2 part by mass on the basis of 100 parts by mass of the raw material organic pigment, from the viewpoint of suppressing change in hue of the pigment. Further, from the viewpoints of suppressing change in hue of the pigment and atomizing the pigment particles, the mixture to be kneaded preferably contains substantially no pigment derivatives.

[Water-Soluble Inorganic Salt]

In the present invention, the water-soluble inorganic salt that is compounded in the mixture to be kneaded is preferably a metal salt, more preferably a metal chloride or a metal sulfate, and even more preferably a metal chloride, from the viewpoint of good pulverization efficiency. The metal of the metal salt is preferably at least one metal selected from the group consisting of an alkali metal and a Group 2 element, and more preferably an alkali metal, from the viewpoints of good water solubility, economy and availability. In addition, from the viewpoints of good economy and availability, the metal of the metal salt is preferably at least one metal selected from the group consisting of sodium, potassium and magnesium, and more preferably sodium. From the viewpoints of good pulverization efficiency and water solubility, the water-soluble inorganic salt is preferably at least one compound selected from the group consisting of an alkali metal chloride and an alkali metal sulfate, and more preferably an alkali metal chloride. In addition, from the viewpoints of good economy and availability, the water-soluble inorganic salt is preferably at least one compound selected from the group consisting of sodium chloride, potassium chloride, sodium sulfate, zinc chloride, calcium chloride and magnesium chloride, more preferably at least one compound selected from the group consisting of sodium chloride and sodium sulfate, and even more preferably sodium chloride.

The solubility of the water-soluble inorganic salt in 100 g of water as measured at 20° C. is preferably not less than 10 g, more preferably not less than 20 g, and even more preferably not less than 30 g, from the viewpoint of facilitated removal of the water-soluble inorganic salt from the mixture obtained though the kneading step, and is also preferably not more than 100 g, more preferably not more than 60 g, and even more preferably not more than 40 g, from the viewpoint of good pulverization efficiency.

The water-soluble inorganic salt is preferably hardly soluble in the water-soluble organic solvent, and more preferably substantially insoluble in the water-soluble organic solvent. The solubility of the water-soluble inorganic salt used in the present invention in 100 g of the water-soluble organic solvent as measured at 20° C. is preferably not more than 10 g, and more preferably not more than 1 g, from the viewpoint of high productivity of the fine organic pigment.

The water-soluble inorganic salt is preferably in the form of particles from the viewpoint of good handling property. The average particle size of the water-soluble inorganic salt is preferably not more than 1000 μm, more preferably not more than 700 μm, even more preferably not more than 400 μm, further even more preferably not more than 200 μm, further even more preferably not more than 50 μm, and further even more preferably not more than 20 μm, from the viewpoint of good pulverization efficiency, and is also preferably not less than 0.1 μm, more preferably not less than 1 μm, and even more preferably not less than 5 μm, from the viewpoint of high productivity.

[Water-Soluble Organic Solvent]

In the present invention, the water-soluble organic solvent compounded in the mixture to be kneaded is preferably an organic solvent that is miscible with water at an optional ratio, from the viewpoint of facilitated removal of the water-soluble organic solvent from the mixture obtained though the kneading step.

The water-soluble organic solvent is preferably in the form of an aliphatic compound containing an alcoholic hydroxyl group from the viewpoints of good safety, economy and availability. The number of the alcoholic hydroxyl groups contained in the aliphatic compound as the water-soluble organic solvent is preferably not less than 1, and more preferably not less than 2, from the viewpoints of good water solubility and workability, and is also preferably not more than 3, more preferably not more than 2, and even more preferably 2, from the viewpoints of good handling property, economy and availability. In addition, the water-soluble organic solvent preferably contains an ether bond, from the viewpoint of good safety. The number of the ether bonds contained in the water-soluble organic solvent is preferably not more than 3, and more preferably not more than 2, and is also preferably not less than 1, and more preferably 1, from the viewpoints of good handling property, economy and availability.

Examples of the water-soluble organic solvent include at least one compound selected from the group consisting of ethylene glycol, diethylene glycol, diethylene glycol monoalkyl ethers, triethylene glycol, triethylene glycol monoalkyl ethers, polyethylene glycol, propylene glycol, dipropylene glycol, dipropylene glycol monoalkyl ethers, polypropylene glycol, 2-propanol, 1-propanol, isobutyl alcohol, 1-butanol, isopentyl alcohol, 1-pentanol, isohexyl alcohol, 1-hexanol and glycerol. Of these water-soluble organic solvents, from the viewpoints of good safety, economy and availability, preferred are glycol-based solvents such as diethylene glycol, propylene glycol, triethylene glycol and polyethylene glycol, and glycerol, and more preferred is diethylene glycol (hereinafter also referred to as "DEG").

The boiling point of the water-soluble organic solvent is preferably not lower than 100° C., and more preferably not lower than 200° C., from the viewpoints of attaining good safety and suppressing evaporation of the organic solvent upon kneading, whereas the solidification point of the water-soluble organic solvent is preferably not higher than 25° C., and more preferably not higher than 0° C., from the viewpoint of good workability.

[Compound (1)]

In the mixture to be kneaded as used in the present invention, the compound represented by the following formula (1) (compound (1)) is compounded in an amount of not less than 0.8 part by mass and not more than 18.0 parts by mass on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order.

As $R^1$, there may be mentioned an aliphatic hydrocarbon group such as an alkyl group and an alkenyl group, an aryl group, etc. Of these groups as $R^1$, from the viewpoint of good pulverization efficiency and high filtration velocity in the step 2 (hereinafter also referred to as "filtering property"), preferred is an aliphatic hydrocarbon group, more preferred is at least one group selected from the group consisting of an alkyl group and an alkenyl group, and even more preferred is an alkyl group. More specifically, as $R^1$, from the viewpoints of good pulverization efficiency and filtering property, preferred is at least one group selected from the group consisting of a 2-ethylhexyl group, a lauryl group, a stearyl group, an oleyl group, a behenyl group and a distyrenated phenyl group, and more preferred is at least one group selected from the group consisting of a lauryl group, a stearyl group and an oleyl group, and further from the viewpoints of good economy and availability, even more preferred is a stearyl group.

The number of carbon atoms in $R^1$ is not less than 8, preferably not less than 10, more preferably not less than 12, and even more preferably not less than 16, from the viewpoints of good pulverization efficiency and filtering property, and is also not more than 24, preferably not more than 22, more preferably not more than 20, and even more preferably not more than 18, from the same viewpoint as described above.

From the viewpoint of facilitated production of the compound (1), m is not more than 30, preferably not more than 15, and more preferably not more than 10. Also, from the viewpoint of good filtering property, m is preferably not more than 5, and more preferably not more than 3, and is also preferably not less than 0, and more preferably 0.

From the viewpoints of good pulverization efficiency, filtering property and cleanability with an aqueous medium, n is not less than 10, preferably not less than 12, more preferably not less than 14, and even more preferably not less than 16. Also, from the viewpoints of good pulverization efficiency and handling property of the compound (1), n is not more than 70, preferably not more than 60, more preferably not more than 50, and even more preferably not more than 40.

A sum of m and n (m+n) is not less than 10, preferably not less than 12, more preferably not less than 14, and even more preferably not less than 16, from the viewpoints of good pulverization efficiency and filtering property, and is also not more than 70, preferably not more than 60, more preferably not more than 50, and even more preferably not more than 40, from the viewpoints of good pulverization efficiency, and good handling property and facilitated production of the compound (1).

The ratio of m to a sum of m and n [m/(m+n)] is preferably not more than 0.5, more preferably not more than 0.2, and even more preferably not more than 0.1, and is also preferably not less than 0, and more preferably 0, from the viewpoints of good filtering property and cleanability with an aqueous medium.

Meanwhile, when both PO and EO are present in the compound, these constituents may be arranged in any optional order.

When both PO and EO are present in the compound, PO and EO may be added, for example, in a random form or in a block form. Among these forms, the block form is preferred. The order of addition of PO and EO in the block form may be optionally selected, and as the block form of PO and EO, there may be mentioned a diblock form, a triblock form, etc., and preferably a diblock form.

When both PO and EO are present in the compound, from the viewpoint of good pulverization efficiency and facilitated production of the compound, it is preferred that an oxygen atom of EO is bonded to A, and it is more preferred that an oxygen atom of $R^1O$ is bonded to a carbon atom of PO, and the oxygen atom of EO is bonded to A.

From the viewpoints of good pulverization efficiency and filtering property, A is preferably a hydrogen atom, $-SO_3^-X^+$ or $-PO_3H^-X^+$, and more preferably a hydrogen atom or $-SO_3^-X^+$. Further, A is even more preferably $-SO_3^-X^+$ from the viewpoint of good filtering property, or A is also even more preferably a hydrogen atom from the viewpoint of facilitated production of the compound (1). From the viewpoint of good pulverization efficiency, $X^+$ is preferably $Na^+$, $K^+$ or $NH_4^+$, and more preferably $Na^+$ or $NH_4^+$. Also, from the viewpoint of good filtering property, $X^+$ is preferably $Na^+$, $K^+$ or $NH_3C_2H_4OH^+$, and more preferably $Na^+$ or $NH_3C_2H_4OH^+$. Further, from the viewpoints of good pulverization efficiency and filtering property, $X^+$ is preferably $Na^+$ or $K^+$. In addition, from the viewpoints of good pulverization efficiency, filtering property, economy and availability, $X^+$ is more preferably $Na^+$.

The amount of the compound (1) compounded in the mixture to be kneaded is not less than 0.8 part by mass, preferably not less than 1.2 parts by mass, more preferably not less than 2.5 parts by mass, and even more preferably not less than 4.5 parts by mass, on the basis of 100 parts by mass of the raw material organic pigment, from the viewpoint of good pulverization efficiency, and is also not more than 18.0 parts by mass, preferably not more than 12.0 parts by mass, more preferably not more than 9.0 parts by mass, and even more preferably not more than 6.0 parts by mass, on the basis of 100 parts by mass of the raw material organic pigment, from the viewpoints of good pulverization efficiency, filtering property and economy.

The content of the compound (1) in the mixture to be kneaded is not less than 0.8 part by mass, preferably not less than 1.2 parts by mass, more preferably not less than 2.5 parts by mass, and even more preferably not less than 4.5 parts by mass, on the basis of 100 parts by mass of the raw material organic pigment, from the viewpoint of good pulverization efficiency, and is also not more than 18.0 parts by mass, preferably not more than 12.0 parts by mass, more preferably not more than 9.0 parts by mass, and even more preferably not more than 6.0 parts by mass, on the basis of 100 parts by mass of the raw material organic pigment, from the viewpoints of good pulverization efficiency, filtering property and economy.

[Water]

From the viewpoint of facilitated atomization of the pigment, water is preferably compounded into the mixture to be kneaded in the present invention, and more preferably compounded therein in an amount of not less than 0.6 part by mass and not more than 10 parts by mass on the basis of 100 parts by mass of the water-soluble inorganic salt. It is considered that when compounding not less than 0.6 part by mass of water in the mixture, the water-soluble inorganic salt acting as pulverization media is enhanced in viscosity on the surface thereof, which results in enhanced pulverization efficiency. Also, it is considered that when compounding not more than 10 parts by mass of water in the mixture, the water-soluble inorganic salt can maintain its shape and therefore can retain a function as pulverization media, which results in enhanced pulverization efficiency.

The amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, on the basis of 100 parts by mass of the water-soluble inorganic salt, from the viewpoint of good pulverization efficiency. Also, from the same viewpoint as described above, the amount of water compounded in the mixture to be kneaded is preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

The content of water in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, on the basis of 100 parts by mass of the water-soluble inorganic salt, from the viewpoint of good pulverization efficiency. Also, from the same viewpoint as described above, the content of water in the mixture to be kneaded is preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

The water compounded in the mixture to be kneaded in the present invention is at least one water selected from the group consisting of tap water, ion-exchanged water, ground water and distilled water. Of these waters, from the viewpoint of maintaining good quality of the resulting fine organic pigment, preferred is ion-exchanged water.

[Water-Soluble Basic Compound]

From the viewpoint of facilitated atomization of the pigment, a water-soluble basic compound is preferably compounded into the mixture to be kneaded in the present invention, and more preferably compounded therein in an amount of not less than 1.5 part by mass and not more than 35 parts by mass on the basis of 100 parts by mass of the raw material organic pigment. It is considered that when compounding not less than 1.5 parts by mass of the water-soluble basic compound in the mixture, a good synergistic effect with a surfactant is exhibited, or the intermolecular hydrogen bond of the pigment is cut, which results in enhanced pulverization efficiency. Also, it is considered that when compounding not more than 35 parts by mass of the water-soluble basic compound in the mixture, the resulting fine organic pigment is enhanced in cleaning efficiency, so that burden on waste water treatment is reduced, and further the fine organic pigment is enhanced in quality.

Examples of the water-soluble basic compound include amines such as methylamine, dimethylamine, trimethylamine, ethylamine, diethylamine and triethylamine; inorganic basic compounds such as ammonia, hydroxides, oxides and carbonates of metals, and the like; and mixtures of these compounds. Of these water-soluble basic compounds, from the viewpoints of good handling property and pulverization efficiency, preferred are inorganic basic compounds. As the inorganic basic compounds, preferred is at least one compound selected from the group consisting of hydroxide and carbonates of alkali metals, and oxides and carbonates of calcium and magnesium from the viewpoint of good economy and availability, more preferred is at least one compound selected from the group consisting of potassium hydroxide, sodium hydroxide, calcium oxide and magnesium oxide from the viewpoint of good pulverization efficiency, even more preferred is at least one compound selected from the group consisting of potassium hydroxide and sodium hydroxide from the viewpoint of enhanced quality of the fine organic pigment, and further even more preferred is sodium hydroxide.

The amount of the water-soluble basic compound compounded in the mixture to be kneaded is preferably not less than 1.5 parts by mass, more preferably not less than 2.0 parts by mass, even more preferably not less than 4.0 parts by mass, further even more preferably not less than 5.5 parts by mass, and further even more preferably not less than 7.0 parts by mass, on the basis of 100 parts by mass of the raw material organic pigment, from the viewpoint of good pulverization efficiency, and is also preferably not more than 35 parts by mass, more preferably not more than 18 parts by mass, even more preferably not more than 15 parts by mass, further even more preferably not more than 12 parts by mass, and further even more preferably not more than 9 parts by mass, on the basis of 100 parts by mass of the raw material organic pigment, from the viewpoints of good economy and enhanced quality of the fine organic pigment.

When compounding the water-soluble basic compound in the mixture, from the viewpoint of good pulverization efficiency, the above water is preferably compounded therein, and more preferably compounded in an amount of not less than 0.6 part by mass and not more than 10 parts by mass on the basis of 100 parts by mass of the water-soluble inorganic salt. It is considered that when compounding not less than 0.6 part by mass of the water in the mixture, the water-soluble inorganic salt acting as pulverization media is enhanced in viscosity on the surface thereof, a good synergistic effect with a surfactant is exhibited, or the water-soluble basic compound is ionized to cut an intermolecular hydrogen bond of the pigment, which results in enhanced pulverization efficiency. Also, it is considered that when compounding not more than 10 parts by mass of the water in the mixture, the water-soluble inorganic salt can maintain its shape and therefore can retain a function as pulverization media, a good synergistic effect with a surfactant can be exhibited, or the concentration of the water-soluble basic compound relative to water can be increased to promote cutting of the intermolecular hydrogen bond of the pigment, which results in enhanced pulverization efficiency.

When compounding the water-soluble basic compound in the mixture, the amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, on the basis of 100 parts by mass of the water-soluble inorganic salt, from the viewpoint of good pulverization efficiency. Also, from the same viewpoint as described above, the amount of water compounded in the mixture to be kneaded is preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

The amount of the water-soluble basic compound compounded in the mixture to be kneaded is preferably not less than 10% by mass, more preferably not less than 22% by mass, even more preferably not less than 30% by mass, further even more preferably not less than 40% by mass, and further even more preferably not less than 45% by mass, on the basis of a total amount of water and the water-soluble basic compound, from the viewpoint of good pulverization efficiency, and is also preferably not more than 80% by mass, more preferably not more than 65% by mass, and even more preferably not more than 50% by mass, on the basis of a total amount of water and the water-soluble basic compound, from the viewpoints of good economy and cleanability after kneading.

[Step 1]

The step 1 (hereinafter also referred to as a "kneading step") is the step of kneading a mixture prepared by compounding the raw material organic pigment, the water-soluble inorganic salt, the water-soluble organic solvent and the compound (1) with each other, in which the compound (1) is compounded in an amount of not less than 0.8 part by mass and not more than 18.0 parts by mass on the basis of 100 parts by mass of the raw material organic pigment. The mixture is preferably further compounded with at least one material selected from the group consisting of water and the water-soluble basic compound, more preferably with water, and even more preferably with both water and the water-soluble basic compound. The mixture obtained through the kneading step (hereinafter also referred to as a "kneaded mixture") contains a fine organic pigment having a small primary particle size.

The kneading step may be carried out using various kneading devices such as a batch type kneader or a continuous type kneader, or a kneader of a normal pressure type, an applied pressure type or a reduced pressure type. Examples of the kneading devices include roll mills such as a twin roll mill, a triple roll mill and a multiple roll mill; extruders such as a single-screw extruder and a twin-screw extruder; and stirring type kneaders such as a planetary mixer. As the stirring type kneader, there may be mentioned "TRIMIX" available from INOUE MFG., INC., and the like. Also, as the extruder, there may be mentioned "KRC Kneader" available from Kurimoto Ltd., "MIRACLE K.C.K." available from Asada Iron Works Co., Ltd., and the like.

The temperature of the mixture upon kneading is preferably not higher than 120° C., and more preferably not higher than 100° C., from the viewpoint of attaining good pulverization efficiency and suppressing evaporation of water, and is also preferably not lower than 20° C., and more preferably not lower than 40° C., from the viewpoint of reducing load for cooling.

The time of the kneading step is preferably not less than 0.5 h, more preferably not less than 1 h, and even more preferably not less than 1.5 h, from the viewpoint of facilitated atomization of the pigment, and is also preferably not more than 15 h, more preferably not more than 10 h, and even more preferably not more than 5 h, from the viewpoint of high productivity.

(Step 1-1 and Step 1-2)

The kneading step may be conducted, for example, by a method in which the raw material organic pigment, the water-soluble inorganic salt, the water-soluble organic solvent and the compound (1) which are used in the present invention are filled in the aforementioned kneading device or the like, and kneaded together therein. From the viewpoint of attaining uniform compositional distribution of the compound (1) in the mixture to be kneaded, the kneading step preferably includes the step of mixing the raw material organic pigment, the water-soluble inorganic salt and the water-soluble organic solvent which are used in the present invention, with each other (hereinafter also referred to as "step 1-1"); and the step of kneading a mixture including the mixture obtained in the step 1-1, the compound (1) and at least one material as an optionally compounded component selected from the group consisting of water and the water-soluble basic compound (hereinafter also referred to as "step 1-2"). Form the viewpoint of good workability, the step 1-1 and the step 1-2 are more preferably carried out using the same kneading device.

When compounding at least one material selected from the group consisting of water and the water-soluble basic compound in the mixture, the step 1-2 is preferably the step of kneading a mixture including the mixture obtained in the step 1-1, the compound (1) and the at least one material selected from the group consisting of water and the water-soluble basic compound.

The time of the step 1-1 is preferably not less than 1 min, more preferably not less than 5 min, and even more preferably not less than 20 min, from the viewpoint of attaining uniform compositional distribution in the mixture to be kneaded, and is also preferably not more than 1 h from the viewpoint of high productivity.

The time of the step 1-2 is preferably not less than 0.5 h, more preferably not less than 1 h, and even more preferably not less than 1.5 h, from the viewpoint of facilitated atomization of the pigment, and is also preferably not more than 15 h, more preferably not more than 10 h, even more preferably not more than 5 h, from the viewpoint of high productivity.

The amount of the water-soluble inorganic salt compounded in the mixture to be kneaded is preferably not less than 100 parts by mass, more preferably not less than 300 parts by mass, and even more preferably not less than 400 parts by mass, on the basis of 100 parts by mass of the raw material organic pigment, from the viewpoint of good pulverization efficiency, and is also preferably not more than 3000 parts by mass, more preferably not more than 1000 parts by mass, and even more preferably not more than 800 parts by mass, on the basis of 100 parts by mass of the raw material organic pigment, from the viewpoint of high productivity.

The amount of the water-soluble organic solvent compounded in the mixture to be kneaded is preferably not less than 10 parts by mass, more preferably not less than 50 parts by mass, and even more preferably not less than 100 parts by mass, on the basis of 100 parts by mass of the raw material organic pigment, from the viewpoint of good pulverization efficiency, and is also preferably not more than 500 parts by mass, more preferably not more than 300 parts by mass, and even more preferably not more than 200 parts by mass, on the basis of 100 parts by mass of the raw material organic pigment, from the same viewpoint as described above.

(Step 1-3)

The process for producing a fine organic pigment according to the present invention preferably further includes the following step 1-3:

step 1-3: kneading the kneaded mixture obtained in the above step 1 or in the above step 1-1 and step 1-2, with a polymer.

In the step 1-3, an organic solvent may be further added.

The kneading conditions such as a kneading device and a kneading temperature used in the step 1-3 are preferably the same as those illustrated in the above step 1.

The kneading time in the step 1-3 is preferably not less than 0.25 h, more preferably not less than 0.5 h, and even more preferably not less than 0.75 h, form the viewpoint of good dispersibility of the pigment, and is also preferably not more than 5 h, more preferably not more than 3 h, and even more preferably not more than 2 h, from the viewpoint of high productivity.

(Polymer)

A polymer may be used in order to attain good dispersibility of the pigment. Examples of the polymer include polyesters, polyurethanes and vinyl polymers. Of these polymers, from the viewpoint of good storage stability of the resulting water dispersion, preferred are vinyl polymers, and more preferred are vinyl polymers obtained by addition-polymerizing at least one vinyl monomer selected from the group consisting of a vinyl compound, a vinylidene compound and a vinylene compound.

The polymer is preferably in the form of an anionic polymer from the viewpoint of good dispersibility. The term "anionic" as used herein means that an unneutralized substance has a pH value of less than 7 when dispersed or dissolved in pure water. Otherwise, if the substance is insoluble in pure water and therefore it is impossible to clearly measure a pH value thereof, the term "anionic" as used herein means that a dispersion prepared by dispersing the substance in pure water has a negative zeta potential.

The polymer used in the present invention is preferably a vinyl polymer that is produced by copolymerizing a monomer mixture containing (a) an anionic monomer (hereinafter also referred to merely as a "component (a)"), and (b) a hydrophobic monomer (hereinafter also referred to merely as a "component (b)") (such a mixture is hereinafter also referred to merely as a "monomer mixture").

The vinyl polymer preferably contains a constitutional unit derived from the component (a), and a constitutional unit derived from the component (b).

[Anionic Monomer: Component (a)]

The component (a) is preferably used as a monomer component constituting the polymer used in the present invention. It is considered that the constitutional unit derived from the component (a) is capable of stably dispersing the pigment in the water dispersion owing to electrostatic repulsion.

Examples of the component (a) include monomers containing an anionic group such as a carboxy group, a sulfo group, a phosphoric group and a phosphonic group. Of these monomers, from the viewpoint of good dispersion stability of the pigment, preferred are monomers containing a carboxy group, and more preferred is at least one monomer selected from the group consisting of acrylic acid and methacrylic acid.

[Hydrophobic Monomer: Component (b)]

The component (b) is preferably used as a monomer component constituting the polymer used in the present invention. It is considered that the constitutional unit derived from the component (b) is capable of promoting adsorption of the polymer onto the surface of the pigment and thereby contributing to good dispersion stability of the pigment.

The component (b) is preferably at least one monomer selected from the group consisting of an alkyl (meth)acrylate and an aromatic compound containing an ethylenic double bond (hereinafter also referred to as an "aromatic monomer"). Of these monomers, from the viewpoint of good dispersion stability of the pigment, preferred is the aromatic monomer.

The aromatic monomer is preferably at least one monomer selected from the group consisting of a styrene-based monomer and an aromatic group-containing (meth)acrylate from the viewpoint of facilitated production of the polymer.

The styrene-based monomer is more preferably styrene from the viewpoint of good availability.

The aromatic group-containing (meth)acrylate is more preferably benzyl (meth)acrylate from the viewpoint of good availability. The term "(meth)acrylate" as used in the present specification means at least one compound selected from the group consisting of an acrylate and a methacrylate.

[Other Monomer Components]

The monomer mixture may also contain, in addition to the above components (a) and (b), the other monomer components. Examples of the other monomer components include compounds represented by the following general formula (c1), macromers containing a polymerizable functional group at one terminal end thereof and having a number-average molecular weight of 500 or more, etc.

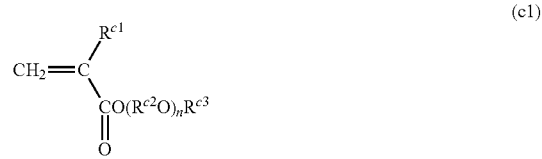

(c1)

In the formula (c1), $R^{c1}$ is a hydrogen atom or a methyl group; $R^{c2}$ is an alkanediyl group having 2 or 3 carbon atoms; n represents an average number of constitutional units represented by ($R^{c2}$O), and is a number of not less than 1 and not more than 100; $R^{c3}$ is a hydrogen atom or a hydrocarbon group having 1 to 24 carbon atoms.

Examples of commercially available products of the macromers include "AS-6(S)", "AN-6(S)" and "HS-6 (S)" available from Toagosei Co., Ltd., etc.

The above components (a) and (b) and other monomer components may be respectively used alone or in combination of any two or more thereof.

The preferred contents of the respective constitutional units derived from the components (a) and (b) in the polymer are as follows.

The content of the constitutional unit derived from the component (a) in the polymer is preferably not less than 2% by mass, and more preferably not less than 10% by mass, and is also preferably not more than 40% by mass, and more preferably not more than 30% by mass, from the viewpoint of good storage stability of the resulting ink.

The content of the constitutional unit derived from the component (b) in the polymer is preferably not less than 40% by mass, and more preferably not less than 60% by mass, and is also preferably not more than 98% by mass, and more preferably not more than 85% by mass, from the viewpoint of enhancing optical density of the resulting ink.

(Production of Polymer)

The polymer used in the present invention may be produced, for example, by copolymerizing the monomer mixture by known methods. The preferred contents of the components (a) and (b) in the monomer mixture are the same as the preferred contents of the respective constitutional units derived from the components (a) and (b) in the aforementioned polymer.

As the polymerization method, preferred is a solution polymerization. The solvent used in the solution polymerization method is preferably at least one solvent selected from the group consisting of ketones, alcohols, ethers and esters which have not less than 4 and not more than 8 carbon atoms, more preferably ketones having not less than 4 and not more than 8 carbon atoms, and even more preferably methyl ethyl ketone (hereinafter also referred to as "MEK") from the viewpoints of facilitated production of the polymer and good dispersibility of the pigment.

The polymerization may be carried out in the presence of a conventionally known polymerization initiator or a conventionally known chain transfer agent. The polymerization initiator is preferably an azo compound, and more preferably 2,2'-azobis(2,4-dimethylvaleronitrile), and the chain transfer agent is preferably mercaptans, and more preferably 2-mercapto ethanol.

The preferred polymerization conditions may vary depending upon the kinds of polymerization initiator, monomers, solvent, etc., to be used. The polymerization temperature is preferably not lower than 50° C. and not higher than 80° C., and the polymerization time is preferably not less than 1 h and not more than 20 h. The polymerization is preferably conducted in an atmosphere of an inert gas such as nitrogen gas and argon.

After completion of the polymerization reaction, the polymer thus produced may be isolated from the reaction solution by a known method such as reprecipitation, removal of solvent by distillation or the like. The thus obtained polymer may be subjected to reprecipitation, membrane separation, chromatography, extraction, etc., for removing unreacted monomers, etc., therefrom.

The weight-average molecular weight of the polymer is preferably not less than 5,000, and more preferably not less than 10,000, and is also preferably not more than 500,000, more preferably not more than 400,000, even more preferably not more than 300,000, and further even more preferably not more than 200,000, from the viewpoint of good dispersion stability of the pigment.

Examples of commercially available products of the polymer include "JONCRYL" series including "67", "68", "678", "680", "682", "683", "690" and "819" all available from BASF Japan, Ltd., etc.

(Neutralizing Agent)

In the present invention, in the case where the polymer contains an anionic group, the anionic group may be neutralized with a neutralizing agent. Examples of the neutralizing agent used for the neutralization include bases such as lithium hydroxide, sodium hydroxide, potassium hydroxide, ammonia and various amines.

The degree of neutralization of the polymer is preferably not less than 10 mol %, more preferably not less than 20 mol %, and even more preferably not less than 30 mol %, from the viewpoint of good dispersion stability of the pigment, and is also preferably not more than 90 mol %, more preferably not more than 80 mol %, and even more preferably not more than 70 mol %, from the viewpoint of good dispersibility of the pigment.

The degree of neutralization of the polymer is calculated according to the following formula:

Degree of neutralization (mol %)={[mass (g) of neutralizing agent/gram equivalent of neutralizing agent]/[acid value (mgKOH/g) of polymer× mass (g) of polymer/(56×1000)]}×100.

The acid value of the polymer may be calculated from the ratio between the monomer components used upon production of the polymer, or may also be determined by the method of subjecting a solution prepared by dissolving the polymer in a solvent such as MEK in which the polymer can be dissolved, to titration with an alkaline agent.

Examples of the preferred organic solvent used in the step 1-3 include those illustrated above as the water-soluble organic solvent used in the step 1.

The content of the organic pigment in the mixture to be kneaded in the step 1-3 is preferably not less than 5% by mass, and more preferably not less than 10% by mass, and is also preferably not more than 50% by mass, and more preferably not more than 40% by mass.

The content of the polymer in the mixture used in the step 1-3 is preferably not less than 10 parts by mass, and more preferably not less than 20 parts by mass, on the basis of 100 parts by mass of the organic pigment, from the viewpoint of good dispersion stability, and is also preferably not more than 100 parts by mass, and more preferably not more than 60 parts by mass, on the basis of 100 parts by mass of the organic pigment, from the same viewpoint as described above.

The content of the organic solvent in the mixture used in the step 1-3 is preferably not less than 10 parts by mass, more preferably not less than 50 parts by mass, and even more preferably not less than 100 parts by mass, on the basis of 100 parts by mass of the organic pigment, from the viewpoint of good processing efficiency, and is also preferably not more than 500 parts by mass, more preferably not more than 300 parts by mass, and even more preferably not more than 250 parts by mass, on the basis of 100 parts by mass of the organic pigment, from the same viewpoint as described above.

[Step 2]

From the viewpoint of facilitated removal of the water-soluble inorganic salt, water-soluble organic solvent and the compound (1) from the kneaded mixture, the step 2 is the step of subjecting the kneaded mixture to cleaning treatment with an aqueous solvent and then to filtration (hereinafter also referred to as a "cleaning step").

The cleaning step may be performed, for example, by the following method. That is, the kneaded mixture is stirred and mixed with an aqueous solvent such as water which is used in an amount enough to dissolve the water-soluble inorganic salt and water-soluble organic solvent contained in the kneaded mixture, thereby obtaining a dispersion of the pigment. Next, the resulting dispersion is subjected to filtration, and the obtained wet cake is cleaned with the aqueous solvent to thereby obtain a paste of a fine organic pigment from which the water-soluble inorganic salt, water-soluble organic solvent and compound (1) are removed (hereinafter also referred to merely as a "pigment paste").

The filtration in the cleaning step may be carried out, for example, using a filter press. As the commercially available filter press, there may be mentioned a Yabuta-type filter press "ROUND TESTER YTO-8 Model" available from Yabuta Kikai Co., Ltd., and a closed automatic continuous pressure filter "Rotary Filter" available from Kotobuki Industries Co., Ltd. The pressure applied upon the filtration is, for example, from 0.1 to 1 MPa.

The aqueous solvent used in the cleaning step is preferably water, and more preferably at least one water selected from the group consisting of tap water, ion-exchanged water, distilled water, ground water, and a mineral acid aqueous solution, from the viewpoint of good cleanability. The aqueous solvent used in the cleaning step is even more preferably ion-exchanged water, from the viewpoint of maintaining good quality of the resulting fine organic pigment, and further even more preferably ground water and a mineral acid aqueous solution, from the viewpoint of good economy.

(Drying Step (Step 2-2))

The pigment paste obtained through the cleaning step is further subjected to drying and pulverization, thereby obtaining the fine organic pigment in the form of a powder.

[Fine Organic Pigment]

The fine organic pigment obtained by the production process of the present invention may be either the pigment paste obtained in the above step 2, or the powdery fine organic pigment obtained through the above drying step.

The fine organic pigment obtained by the production process of the present invention includes, for example, the pigment derived from the above raw material organic pigment and a pigment derivative optionally added thereto. In addition, the fine organic pigment has a smaller primary particle size than that of the raw material organic pigment. For example, the ratio of the primary particle size of the fine organic pigment to the primary particle size of the raw material organic pigment (primary particle size of fine organic pigment/primary particle size of raw material organic pigment) is preferably not more than 0.9, more preferably not more than 0.8, and even more preferably not more than 0.7, and from the viewpoint of good working efficiency, the ratio is also preferably not less than 0.01, more preferably not less than 0.1, and even more preferably not less than 0.2.

The primary particle size of the fine organic pigment may vary depending upon the kind and applications of the pigment. For example, the primary particle size of the fine organic pigment is preferably not less than 10 nm, more preferably not less than 20 nm, and even more preferably not less than 30 nm, and is also preferably not more than 130 nm, more preferably not more than 70 nm, and even more preferably not more than 60 nm.

In addition, the primary particle size of the fine organic pigment may be suitably controlled by appropriately selecting the raw material organic pigment and adjusting amounts of the respective components compounded in the mixture to be kneaded and the kneading conditions such as kneading time.

Meanwhile, the primary particle size of the fine organic pigment may be measured by the method described in Examples below.

The fine organic pigment obtained by the production process of the present invention may be suitably used in the applications such as inks for ink-jet printing and color filters, as well as in the applications such as printing inks other than those for ink-jet printing, paints, colored resin molded articles and toners for development of electrostatic latent images. Of these applications, the fine organic pigment of the present invention is preferably used for ink-jet printing. The ink-jet printing method may be, for example, such a method in which droplets of ink are projected from nozzles and allowed to adhere onto a recording medium to obtain printed matters on which characters or images are printed.

[Production of Dispersion]

The dispersion of the present invention is produced using the above fine organic pigment.

The dispersion may be efficiently produced, for example, by the process including the step of dispersing a mixture containing the fine organic pigment and a solvent.

(Step 3)

Also, the dispersion is preferably efficiently produced by the process including the following step 3.

step 3: subjecting the above paste of the fine organic pigment, an organic solvent and water to dispersing treatment.

In the above step 3, a polymer or a dispersant may be added, if required, and furthermore a neutralizing agent, a crosslinking agent, etc., may also be added.

As the dispersant, there may be mentioned at least one material selected from the group consisting of a surfactant, a (meth)acrylic acid-based (co)polymer, an aliphatic hydroxycarboxylic acid residue-containing polyester-based oligomer, an organosiloxane polymer and a basic urethane resin. As the preferred polymer and neutralizing agent, there may be used those illustrated in the aforementioned step 1-3.

(Solvent)

Examples of the solvent include water and an organic solvent.

Specific examples of the water include tap water, ion-exchanged water and distilled water. Of these waters, preferred is ion-exchanged water.

Specific examples of the organic solvent include ketone solvents such as acetone, MEK, methyl isobutyl ketone and diethyl ketone; alcohol solvents such as methanol, ethanol, propanol and butanol; ether solvents such as dibutyl ether, tetrahydrofuran, dioxane, propylene glycol monomethyl ether acetate (hereinafter also referred to as "PGMEA") and diethylene glycol monobutyl ether acetate (hereinafter also referred to as "BCA"); and ester solvents such as ethyl acetate and butyl acetate. Of these organic solvents, preferred are acetone, MEK and PGMEA.

In the above step 3, there are used the organic solvent and water. The organic solvent is preferably a ketone solvent, and more preferably MEK.

(Crosslinking Agent)

In the present invention, in order to enhance storage stability of the dispersion and ink, the polymer may be crosslinked with a crosslinking agent containing two or more reactive functional groups in a molecule thereof. Examples of the crosslinking agent include compounds containing two or more epoxy groups in a molecule thereof, such as ethylene glycol diglycidyl ether.

The method of dispersing the mixture may be selected from optional methods. Preferably, the mixture is first subjected to a preliminary dispersion treatment, and then to substantial dispersion treatment by applying a shear stress thereto, from the viewpoint of well controlling the average particle size of the obtained pigment particles to a desired value.

Upon subjecting the mixture to the preliminary dispersion treatment, there may be used ordinary mixing or stirring devices such as anchor blades and disper blades. Specific examples of the preferred mixing or stirring devices include high-speed stirring mixers such as "Ultra Disper", "Dispamill" available from Asada Iron Works Co., Ltd., "Milder" available from Ebara Corporation, "Milder" available from Pacific Machinery & Engineering Co., Ltd., and "TK Homomixer", "TK Pipeline Mixer", "TK Homo Jetter", "TK Homomic Line Flow" and "Filmix" all available from Primix Co., Ltd.

As a means for applying a shear stress to the mixture in the substantial dispersion treatment, there may be used, for example, kneading machines such as roll mills, kneaders and extruders, homo-valve-type high-pressure homogenizers such as typically "High-Pressure Homogenizer" available from Izumi Food Machinery Co., Ltd., chamber-type high-pressure homogenizers such as "MICROFLUIDIZER" available from Microfluidics Corp., "Nanomizer" available from Yoshida Kikai Kogyo Co., Ltd., and "Ultimizer" and "Starburst" both available from Sugino Machine Ltd., and media type dispersers such as a paint shaker and a beads mill. Examples of commercially available products of the media type dispersers include "Ultra Apex Mill" available from Kotobuki Industries Co., Ltd., "Pico Mill" available from Asada Iron Works Co., Ltd., and "Dainomill" available from Shinmaru Enterprise Corp. These apparatuses may be used in combination of any two or more thereof. Among these apparatuses, the high-pressure homogenizers and the media type dispersers are preferably used from the viewpoints of reducing a particle size of the pigment particles and stabilizing the dispersion.

The dispersing treatment in the step 3 is preferably conducted using the high-pressure homogenizers.

The temperature upon the dispersion treatment is preferably not lower than 5° C., and is also preferably not higher than 50° C., and more preferably not higher than 35° C., from the viewpoint of attaining high dispersibility of the pigment.

The dispersing time is preferably not less than 1 h, and is also preferably not more than 30 h, and more preferably not more than 25 h, from the viewpoint of attaining high dispersibility of the pigment.

When using the high-pressure homogenizer in the step 3, the treating pressure of the dispersing treatment is preferably not less than 50 MPa, more preferably not less than 100 MPa, and even more preferably not less than 120 MPa, and is also preferably not more than 600 MPa, more preferably not more than 300 MPa, and even more preferably not more than 200 MPa.

When using the high-pressure homogenizer in the step 3, the number of passes through the homogenizer is preferably not less than 3, more preferably not less than 5, and even more preferably not less than 10, and is also preferably not more than 60, more preferably not more than 40, and even more preferably not more than 30.

The content of the fine organic pigment in the dispersion is preferably not less than 5% by mass, and more preferably not less than 10% by mass, and is also preferably not more than 50% by mass, and more preferably not more than 40% by mass.

The content of the dispersant in the dispersion is preferably not less than 2% by mass, and more preferably not less than 3% by mass, and is also preferably not more than 40% by mass, and more preferably not more than 20% by mass.

The content of the solvent in the dispersion is preferably not less than 10% by mass, and is also preferably not more than 90% by mass, more preferably not more than 70% by mass, and even more preferably not more than 50% by mass.

The dispersion thus prepared using the aqueous medium may be compounded with the water-soluble organic solvent and, if required, ordinary additives such as a wetting agent, and may be used as a water-based ink.

When the dispersion is prepared using an organic solvent, the resulting dispersion may be used as a coloring composition for color filters (color resist) and a raw material thereof.

[Production of Ink (Step 4)]

The process for producing an ink according to the present invention include the following step 4.

step 4: mixing the dispersion obtained by the above process with at least one material selected from the group consisting of water and an organic solvent.

By conducting the step 4, it is possible to obtain a water-based ink having desired ink properties such as concentration and viscosity.

Examples of the organic solvent used in the step 4 include polyhydric alcohols, polyhydric alcohol alkyl ethers, polyhydric alcohol alkyl ether acetates and nitrogen-containing heterocyclic compounds.

Specific examples of the polyhydric alcohols include DEG, propylene glycol, 1,2-hexanediol, 1,3-hexanediol, 1,6-hexanediol, triethylene glycol and glycerol. Of these polyhydric alcohols, preferred is at least one compound selected from the group consisting of glycerol, propylene glycol and DEG.

Specific examples of the polyhydric alcohol alkyl ethers include diethylene glycol monoalkyl ethers and triethylene glycol monoalkyl ethers. Of these compounds, preferred is triethylene glycol monobutyl ether.

Specific examples of the polyhydric alcohol alkyl ether acetates include PGMEA and BCA.

Specific examples of the nitrogen-containing heterocyclic compounds include N-methyl-2-pyrrolidone and 2-pyrrolidone.

These organic solvents may be used alone or in combination of any two or more thereof.

In the step 4, in addition to the aforementioned water and organic solvent, various additives such as a humectant, a wetting agent, a penetrant, a dispersant, a surfactant, a viscosity modifier, a defoaming agent, an antiseptic agent, a mildew-proofing agent and a rust preventive may be mixed in the dispersion.

The solid content of the ink obtained by the production process of the present invention is preferably not less than 1% by mass, more preferably not less than 2% by mass, and even more preferably not less than 3% by mass, from the viewpoint of obtaining an ink with a high concentration, and is also preferably not more than 30% by mass, more preferably not more than 20% by mass, and even more preferably not more than 15% by mass, from the viewpoint of good dispersion stability of the ink.

With respect to the aforementioned embodiments, the present invention further provides the following aspects relating to the process for producing a fine organic pigment, the fine organic pigment, the dispersion, etc.

<1> A process for producing a fine organic pigment, including the following steps 1 and 2:

step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass on the basis of 100 parts by mass of the raw material organic pigment:

$$R^1O(PO)_m(EO)_nA \tag{1}$$

wherein R¹ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration.

<2> The process according to the aspect <1>, wherein the raw material organic pigment is preferably at least one pigment selected from the group consisting of quinacridone pigments, diketopyrrolopyrrole pigments, disazo pigments and benzimidazolone pigments.

<3> The process according to the aspect <1> or <2>, wherein a primary particle size of the raw material organic pigment is preferably not more than 500 nm, more preferably not more than 300 nm, and even more preferably not more than 150 nm, and is also preferably not less than 30 nm, more preferably not less than 45 nm, and even more preferably not less than 60 nm.

<4> The process according to any one of the aspects <1> to <3>, wherein the water-soluble inorganic salt is preferably at least one compound selected from the group consisting of an alkali metal chloride and an alkali metal sulfate, and more preferably an alkali metal chloride.

<5> The process according to any one of the aspects <1> to <4>, wherein the water-soluble inorganic salt is preferably at least one compound selected from the group consisting of sodium chloride, potassium chloride, sodium sulfate, zinc chloride, calcium chloride and magnesium chloride, more preferably at least one compound selected from the group consisting of sodium chloride and sodium sulfate, and even more preferably sodium chloride.

<6> The process according to any one of the aspects <1> to <5>, wherein a solubility of the water-soluble inorganic salt in 100 g of water as measured at 20° C. is preferably not less than 10 g, more preferably not less than 20 g, and even more preferably not less than 30 g, and is also preferably not more than 100 g, more preferably not more than 60 g, and even more preferably not more than 40 g.

<7> The process according to any one of the aspects <1> to <6>, wherein the water-soluble inorganic salt is preferably hardly soluble in the water-soluble organic solvent, and more preferably substantially insoluble in the water-soluble organic solvent.

<8> The process according to any one of the aspects <1> to <7>, wherein a solubility of the water-soluble inorganic salt in 100 g of the water-soluble organic solvent as measured at 20° C. is preferably not more than 10 g, and more preferably not more than 1 g.

<9> The process according to any one of the aspects <1> to <8>, wherein the water-soluble inorganic salt is preferably in the form of particles, and an average particle size of the water-soluble inorganic salt is preferably not more than 1000 μm, more preferably not more than 700 μm, even more preferably not more than 400 μm, further even more preferably not more than 200 μm, further even more preferably not more than 50 μm, and further even more preferably not more than 20 μm, and is also preferably not less than 0.1 μm, more preferably not less than 1 μm, and even more preferably not less than 5 μm.

<10> The process according to any one of the aspects <1> to <9>, wherein the water-soluble organic solvent is preferably a glycol-based solvent or glycerol, and more preferably diethylene glycol.

<11> The process according to any one of the aspects <1> to <10>, wherein R¹ is preferably an aliphatic hydrocarbon group, more preferably at least one group selected from the group consisting of an alkyl group and an alkenyl group, and even more preferably an alkyl group.

<12> The process according to any one of the aspects <1> to <11>, wherein R¹ is preferably at least one group selected from the group consisting of a 2-ethylhexyl group, a lauryl group, a stearyl group, an oleyl group, a behenyl group and a distyrenated phenyl group, more preferably at least one group selected from the group consisting of a lauryl group, a stearyl group and an oleyl group, and even more preferably a stearyl group.

<13> The process according to any one of the aspects <1> to <12>, wherein the number of carbon atoms in R¹ is not less than 8, preferably not less than 10, more preferably not less than 12, and even more preferably not less than 16, and is also not more than 24, preferably not more than 22, more preferably not more than 20, and even more preferably not more than 18.

<14> The process according to any one of the aspects <1> to <13>, wherein m is not more than 30, preferably not more than 15, and more preferably not more than 10, and is also preferably not more than 5, more preferably not more than 3, and is also preferably not less than 0, and more preferably 0.

<15> The process according to any one of the aspects <1> to <14>, wherein n is not less than 10, preferably not less than 12, more preferably not less than 14, and even more preferably not less than 16, and is also not more than 70, preferably not more than 60, more preferably not more than 50, and even more preferably not more than 40.

<16> The process according to any one of the aspects <1> to <15>, wherein a sum of m and n (m+n) is not less than 10, preferably not less than 12, more preferably not less than 14, and even more preferably not less than 16, and is also not more than 70, preferably not more than 60, more preferably not more than 50, and even more preferably not more than 40.

<17> The process according to any one of the aspects <1> to <16>, wherein a ratio of m to a sum of m and n [m/(m+n)] is preferably not more than 0.5, more preferably not more than 0.2, and even more preferably not more than 0.1, and is also preferably not less than 0, and more preferably 0.

<18> The process according to any one of the aspects <1> to <17>, wherein when both PO and EO are present, PO and EO are preferably added in a block form, and more preferably in a diblock form.

<19> The process according to any one of the aspects <1> to <18>, wherein when both PO and EO are present, it is preferred that an oxygen atom of EO is bonded to A, and it is more preferred that an oxygen atom of R¹O is bonded to a carbon atom of PO, and the oxygen atom of EO is bonded to A.

<20> The process according to any one of the aspects <1> to <19>, wherein A is preferably a hydrogen atom, $-SO_3^-X^+$ or $-PO_3H^-X^+$, and more preferably a hydrogen atom or $-SO_3^-X^+$, and even more preferably $-SO_3^-X^+$, and also even more preferably a hydrogen atom.

<21> The process according to any one of the aspects <1> to <20>, wherein $X^+$ is preferably $Na^+$, $K^+$ or $NH_4^+$, and more preferably $Na^+$ or $NH_4^+$.

<22> The process according to any one of the aspects <1> to <20>, wherein $X^+$ is preferably $Na^+$, $K^+$ or $NH_3C_2H_4OH^+$, and more preferably $Na^+$ or $NH_3C_2H_4OH^+$.

<23> The process according to any one of the aspects <1> to <20>, wherein $X^+$ is even more preferably $Na^+$ or $K^+$.

<24> The process according to any one of the aspects <1> to <20>, wherein $X^+$ is further even more preferably $Na^+$.

<25> The process according to any one of the aspects <1> to <24>, wherein an amount of the compound (1) compounded in the mixture to be kneaded is not less than 0.8 part by mass, preferably not less than 1.2 parts by mass, more preferably not less than 2.5 parts by mass, and even more preferably not less than 4.5 parts by mass, and is also not more than 18.0 parts by mass, preferably not more than 12.0 parts by mass, more preferably not more than 9.0 parts by mass, and even more preferably not more than 6.0 parts by mass, on the basis of 100 parts by mass of the raw material organic pigment.

<26> The process according to any one of the aspects <1> to <25>, wherein a content of the compound (1) in the mixture to be kneaded is not less than 0.8 part by mass, preferably not less than 1.2 parts by mass, more preferably not less than 2.5 parts by mass, and even more preferably not less than 4.5 parts by mass, and is also not more than 18.0 parts by mass, preferably not more than 12.0 parts by mass, more preferably not more than 9.0 parts by mass, and even more preferably not more than 6.0 parts by mass, on the basis of 100 parts by mass of the raw material organic pigment.

<27> The process according to any one of the aspects <1> to <26>, wherein in the step 1, water is preferably further compounded, and more preferably compounded in an amount of not less than 0.6 part by mass and not more than 10 parts by mass on the basis of 100 parts by mass of the water-soluble inorganic salt.

<28> The process according to the aspect <27>, wherein an amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<29> The process according to the aspect <27> or <28>, wherein a content of water in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<30> The process according to any one of the aspects <1> to <29>, wherein in the step 1, a water-soluble basic compound is preferably further compounded, and more preferably compounded in an amount of not less than 1.5 part by mass and not more than 35 parts by mass on the basis of 100 parts by mass of the raw material organic pigment.

<31> The process according to the aspect <30>, wherein an amount of the water-soluble basic compound compounded in the mixture to be kneaded is preferably not less than 1.5 parts by mass, more preferably not less than 2.0 parts by mass, even more preferably not less than 4.0 parts by mass, further even more preferably not less than 5.5 parts by mass, and further even more preferably not less than 7.0 parts by mass, and is also preferably not more than 35 parts by mass, more preferably not more than 18 parts by mass, even more preferably not more than 15 parts by mass, further even more preferably not more than 12 parts by mass, and further even more preferably not more than 9 parts by mass, on the basis of 100 parts by mass of the raw material organic pigment.

<32> The process according to the aspect <30> or <31>, wherein an amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and from the same viewpoint, is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<33> The process according to any one of the aspects <30> to <32>, wherein an amount of the water-soluble basic compound compounded in the mixture to be kneaded is preferably not less than 10% by mass, more preferably not less than 22% by mass, even more preferably not less than 30% by mass, further even more preferably not less than 40% by mass, and further even more preferably not less than 45% by mass, and is also preferably not more than 80% by mass, more preferably not more than 65% by mass, and even more preferably not more than 50% by mass, on the basis of a total amount of water and the water-soluble basic compound.

<34> The process according to any one of the aspects <1> to <33>, wherein the step 1 preferably includes the following steps 1-1 and 1-2:

step 1-1: mixing the raw material organic pigment, particles of the water-soluble inorganic salt and the water-soluble organic solvent with each other; and step 1-2: kneading a mixture including the mixture obtained in the step 1-1, the compound represented by the formula (1) and at least one material as an optionally compounded component selected from the group consisting of water and the water-soluble basic compound.

<35> The process according to any one of the aspects <1> to <34>, wherein an amount of the water-soluble inorganic salt compounded in the mixture to be kneaded is preferably not less than 100 parts by mass, more preferably not less than 300 parts by mass, and even more preferably not less than 400 parts by mass, and is also preferably not more than 3000 parts by mass, more preferably not more than 1000 parts by mass, and even more preferably not more than 800 parts by mass, on the basis of 100 parts by mass of the raw material organic pigment.

<36> The process according to any one of the aspects <1> to <35>, wherein an amount of the water-soluble organic solvent compounded in the mixture to be kneaded is preferably not less than 10 parts by mass, more preferably not less than 50 parts by mass, and even more preferably not less than 100 parts by mass, and is also preferably not more than 500 parts by mass, more preferably not more than 300 parts by mass, and even more preferably not more than 200 parts by mass, on the basis of 100 parts by mass of the raw material organic pigment.

<37> The process according to any one of the aspects <1> to <36>, wherein the filtration in the step 2 is carried out using a filter press.

<38> The process according to any one of the aspects <1> to <37>, preferably further including the following step 1-3:

step 1-3: kneading the kneaded mixture obtained in the step 1 or in the step 1-1 and step 1-2, with a polymer.

<39> The process according to the aspect <38>, wherein the polymer is preferably an anionic polymer.

<40> The process according to the aspect <38> or <39>, wherein the polymer is preferably a vinyl polymer that is produced by copolymerizing a monomer mixture containing (a) an anionic monomer and (b) a hydrophobic monomer.

<41> The process according to any one of the aspects <38> to <40>, wherein a weight-average molecular weight of the polymer is preferably not less than 5,000, and more preferably not less than 10,000, and is also preferably not more than 500,000, more preferably not more than 400,000, even more preferably not more than 300,000, and further even more preferably not more than 200,000.

<42> The process according to any one of the aspects <38> to <41>, wherein a content of the organic pigment in the mixture to be kneaded in the step 1-3 is preferably not less than 5% by mass, and more preferably not less than 10% by mass, and is also preferably not more than 50% by mass, and more preferably not more than 40% by mass.

<43> The process according to any one of the aspects <38> to <42>, wherein a content of the polymer in the mixture used in the step 1-3 is preferably not less than 10 parts by mass, and more preferably not less than 20 parts by mass, and is also preferably not more than 100 parts by mass, and more preferably not more than 60 parts by mass, on the basis of 100 parts by mass of the organic pigment.

<44> The process according to any one of the aspects <38> to <43>, wherein a content of the organic solvent in the mixture used in the step 1-3 is preferably not less than 10 parts by mass, more preferably not less than 50 parts by mass, and even more preferably not less than 100 parts by mass, and is also preferably not more than 500 parts by mass, more preferably not more than 300 parts by mass, and even more preferably not more than 250 parts by mass, on the basis of 100 parts by mass of the organic pigment.

<45> A process for producing a paste of a fine organic pigment, including the following steps 1 and 2:

step 1: kneading a mixture prepared by compounding a raw material organic pigment, a water-soluble inorganic salt, a water-soluble organic solvent and a compound represented by the formula (1) with each other, the compound being compounded in an amount of not less than 0.8 part by mass and not more than 18.0 parts by mass on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration.

<46> The process for producing a paste of a fine organic pigment according to the aspect <45>, wherein in the step 1, water is preferably further compounded, and more preferably compounded in an amount of not less than 0.6 part by mass and not more than 10 parts by mass on the basis of 100 parts by mass of the water-soluble inorganic salt.

<47> The process for producing a paste of a fine organic pigment according to the aspect <45> or <46>, wherein an amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<48> The process for producing a paste of a fine organic pigment according to any one of the aspects <45> to <47>, wherein a content of water in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<49> The process for producing a paste of a fine organic pigment according to any one of the aspects <45> to <48>, wherein in the step 1, a water-soluble basic compound is preferably further compounded, and more preferably compounded in an amount of not less than 1.5 part by mass and not more than 35 parts by mass on the basis of 100 parts by mass of the raw material organic pigment.

<50> The process for producing a paste of a fine organic pigment according to the aspect <49>, wherein an amount of the water-soluble basic compound compounded in the mixture to be kneaded is preferably not less than 1.5 parts by mass, more preferably not less than 2.0 parts by mass, even more preferably not less than 4.0 parts by mass, further even more preferably not less than 5.5 parts by mass, and further even more preferably not less than 7.0 parts by mass, and is also preferably not more than 35 parts by mass, more preferably not more than 18 parts by mass, even more preferably not more than 15 parts by mass, further even more preferably not more than 12 parts by mass, and further even more preferably not more than 9 parts by mass, on the basis of 100 parts by mass of the raw material organic pigment.

<51> The process for producing a paste of a fine organic pigment according to the aspect <49> or <50>, wherein an amount of water compounded in the mixture to be kneaded is preferably not less than 0.6 part by mass, more preferably not less than 0.8 part by mass, even more preferably not less than 1.1 parts by mass, further even more preferably not less than 1.3 parts by mass, and further even more preferably not less than 1.5 parts by mass, and from the same viewpoint, is also preferably not more than 7.0 parts by mass, more preferably not more than 5.2 parts by mass, even more preferably not more than 3.5 parts by mass, further even more preferably not more than 3.0 parts by mass, further even more preferably not more than 2.4 parts by mass, and further even more preferably not more than 1.7 parts by mass, on the basis of 100 parts by mass of the water-soluble inorganic salt.

<52> The process for producing a paste of a fine organic pigment according to the aspect <51>, wherein an amount of the water-soluble basic compound compounded in the mixture to be kneaded is preferably not less than 10% by mass, more preferably not less than 22% by mass, even more preferably not less than 30% by mass, further even more preferably not less than 40% by mass, and further even more preferably not less than 45% by mass, and is also preferably not more than 80% by mass, more preferably not more than 65% by mass, and even more preferably not more than 50% by mass, on the basis of a total amount of water and the water-soluble basic compound.

<53> The process for producing a paste of a fine organic pigment according to any one of the aspects <45> to <52>, preferably further including the following step 1-3:
step 1-3: kneading the kneaded mixture obtained in the step 1 with a polymer,
wherein the step 2 is a step of cleaning the kneaded mixture obtained in the step 1-3.

<54> A process for producing a powdery fine organic pigment, including the following steps 1, 2 and 2-2:
step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and
step 2: subjecting the mixture obtained in the step 1 to cleaning treatment with an aqueous solvent and then to filtration to obtain a paste of a fine organic pigment; and
step 2-2: further subjecting the paste of the fine organic pigment obtained through the step 2 to drying and pulverization to thereby obtain the powdery fine organic pigment.

<55> The process according to any one of the aspects <1> to <54>, wherein a ratio of a primary particle size of the fine organic pigment to a primary particle size of the raw material organic pigment (primary particle size of fine organic pigment/primary particle size of raw material organic pigment) is preferably not more than 0.9, more preferably not more than 0.8, and even more preferably not more than 0.7, and is also preferably not less than 0.01, more preferably not less than 0.1, and even more preferably not less than 0.2.

<56> The process according to any one of the aspects <1> to <55>, wherein the primary particle size of the fine organic pigment is preferably not less than 10 nm, more preferably not less than 20 nm, and even more preferably not less than 30 nm, and is also preferably not more than 130 nm, more preferably not more than 70 nm, and even more preferably not more than 60 nm.

<57> A process for producing a dispersion, including the step of dispersing a mixture containing the fine organic pigment produced by the process according to any one of the aspects <1> to <56> and a solvent.

<58> A process for producing a dispersion, including the following step 3:
step 3: subjecting the paste of the fine organic pigment produced by the process according to any one of the aspects <45> to <53>, an organic solvent and water to dispersing treatment.

<59> A process for producing a dispersion, including the following steps 1 to 3:
step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass, on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and
step 2: subjecting the mixture obtained in the step 1 to cleaning treatment with an aqueous solvent and then to filtration to obtain a paste of a fine organic pigment; and step 3: subjecting the paste of the fine organic pigment obtained in the step 2, an organic solvent and water to dispersing treatment.

<60> The process according to the aspect <58> or <59>, wherein the organic solvent used in the step 3 is preferably at least one solvent selected from the group consisting of acetone, methyl ethyl ketone and propylene glycol monomethyl ether acetate.

<61> The process according to any one of the aspects <58> to <60>, wherein the dispersing treatment is preferably carried out using a high-pressure homogenizer.

<62> The process according to the aspect <61>, wherein a treating pressure of the dispersing treatment is preferably not less than 50 MPa, more preferably not less than 100 MPa, and even more preferably not less than 120 MPa, and is also preferably not more than 600 MPa, more preferably not more than 300 MPa, and even more preferably not more than 200 MPa.

<63> The process according to the aspect <61> or <62>, wherein the number of passes through the homogenizer is preferably not less than 3, more preferably not less than 5, and even more preferably not less than 10, and is also preferably not more than 60, more preferably not more than 40, and even more preferably not more than 30.

<64> A process for producing an ink, including the following step 4:
step 4: mixing the dispersion produced by the process according to any one of the aspects <57> to <63> with at least one material selected from the group consisting of water and an organic solvent.

<65> A process for producing an ink, including the following steps 1 to 4:
step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass, on the basis of 100 parts by mass of the raw material organic pigment:

$$R^1O(PO)_m(EO)_nA \qquad (1)$$

wherein $R^1$ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n (m+n) is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration to obtain a paste of a fine organic pigment;

step 3: subjecting the paste of the fine organic pigment obtained in the step 2, an organic solvent and water to dispersing treatment to obtain a dispersion; and step 4: mixing the dispersion obtained in the step 3 with at least one material selected from the group consisting of water and an organic solvent.

<66> The process according to the aspect <65>, wherein the organic solvent used in the step 4 is preferably at least one solvent selected from the group consisting of polyhydric alcohols, polyhydric alcohol alkyl ethers, polyhydric alcohol alkyl ether acetates and nitrogen-containing heterocyclic compounds.

<67> The process according to any one of the aspects <64> to <66>, wherein a solid content of the resulting ink is preferably not less than 1% by mass, more preferably not less than 2% by mass, and even more preferably not less than 3% by mass, and is also preferably not more than 30% by mass, more preferably not more than 20% by mass, and even more preferably not more than 15% by mass.

<68> A fine organic pigment produced by the process according to any one of the aspects <1> to <44>.

<69> A dispersion produced by the process according to any one of the aspects <45> to <62>.

<70> An ink produced by the process according to any one of the aspects <63> to 30<67>.

EXAMPLES

In the following Synthesis Examples, Production Examples, Examples and Comparative Examples, propyleneoxide and ethyleneoxide are also referred to as "PO" and "EO", respectively. In addition, in the following Examples, etc., various numerical values were measured and evaluated by the following methods.

(1) Measurement of Average Molar Number of Addition of PO and EO

Using an NMR measuring apparatus "Mercury 400 Model" available from Varian Inc., a proton nuclear magnetic resonance ($^1$H-NMR) spectrum of a sample prepared by esterifying an end hydroxyl group of a synthesized compound with trifluoroacetic acid was measured (measuring conditions: non-decoupling method; relaxation time: 10 s; cumulative number: 32 times). The measurement was conducted using a solution prepared by dissolving 0.01 g of the trifluoroacetic acid-treated sample in 0.99 g of heavy chloroform. The average molar numbers of addition of PO and EO were respectively calculated according to the following formulae.

Average molar number of addition of PO=(integrated value of signal derived from methyl group of polyoxypropylene)/(integrated value of signal derived from methylene group adjacent to trifluoroacetic acid ester group)/1.5

Average molar number of addition of EO=(integrated value of signal derived from methylene group of polyoxyethylene)/(integrated value of signal derived from methylene group adjacent to trifluoroacetic acid ester group)/2

(2) Measurement of Primary Particle Size of Pigment

A dispersion obtained by adding 0.05 g of pigment powder to 50 g of ethanol was treated using an ultrasonic cleaner "ASU CLEANER ASU-10M" (intensity: "high") available from AS ONE Corporation for 5 min. The resulting pigment dispersion was placed on a sampling table for a transmission electron microscope (TEM) and air-dried, and then photographed by TEM at a magnification of 1 to 100,000 times to obtain a micrograph image. From the obtained image, about 500 pigment particles were randomly sampled, and all of the thus sampled particles were measured for their major axis diameters to calculate an average value of the measured diameters which was defined as a primary particle size of the pigment.

(3) Filtration Velocity and Filtration Velocity Retention Rate

In the respective Examples, etc., when feeding 50 L of water under a pressure of 0.2 MPa, the amount (mL) of a filtrate discharged for 10 min after the elapse of 30 min from initiation of the feeding under pressure was measured to calculate a discharge velocity of the filtrate which was defined as the filtration velocity.

In addition, a control sample was prepared by the same method as described in the respective Examples, etc., except for compounding no compound (1) therein, to measure a filtration velocity thereof. The ratio (%) of the filtration velocity of the target sample to that of the control sample was determined and defined as a filtration velocity retention rate.

(4) Measurement of Solid Content

A petri dish was charged with 10 g of dried anhydrous sodium sulfate and fitted with a glass bar, and 1 g of a sample was weighed and added thereto, and the contents of the petri dish were mixed by the glass bar and then dried at 105° C. for 2 h. The mass of the contents of the petri dish after being dried was measured to calculate a solid content of the sample according to the following formula.

Solid content (% by mass)=[(mass (g) after being dried)−(total mass (g) of petri dish, glass bar and dried anhydrous sodium sulfate)]/(mass (g) of sample)×100

(5) Measurement of Average Particle Size of Ink

The average particle size of particles in the ink was measured by using a laser particle analyzing system "ELS-8000" available from Otsuka Electronics Co., Ltd., by cumulant analysis (temperature: 25° C.; angle between incident light and detector: 90°; cumulative number: 100 times; refractive index of dispersing solvent: 1.333). The measurement was conducted by adjusting a concentration of a sample to be measured to about $5\times10^{-3}$% by mass using ion-exchanged water.

(6) Measurement of Gloss

Solid image printing was carried out on a printing paper ("PHOTO PAPER <GLOSSY> KA4100PSKR" available from Seiko Epson Corporation; 20° gloss: 17) using a piezoelectric type printer ("EM-930C" available from Seiko Epson Corporation) under the following printing conditions:

Kind of Paper: Photo printing paper; and
Mode set: Photo.

After allowing the printed paper to stand at 25° C. for 24 h, the 20° gloss value of the resulting printed image was measured 5 times using a gloss meter ("HANDY GLOSS-METER, PG-1" available from Nippon Denshoku Industries Co., Ltd.), and an average value of the thus measured gloss values was calculated and defined as a gloss of a sample measured. The higher the thus measured gloss value, the more excellent the glossiness of the sample.

Synthesis Example 1

Synthesis of Compound D-3

A 6.0 L-capacity autoclave equipped with a stirrer and a temperature controller was charged with 126.3 g (0.97 mol) of 2-ethyl-1-hexanol (available from Wako Pure Chemical Industries, Ltd.) and 3.51 g of a 48% by mass potassium hydroxide aqueous solution (available from Kanto Chemical Co., Inc.), and the inside of the autoclave was replaced with nitrogen and then held at 110° C. under 10.0 kPa for 1.0 h to remove water therefrom. The inside pressure of the autoclave was returned to an atmospheric pressure by introducing nitrogen thereinto, and the contents of the autoclave were heated to 140° C. at which EO addition reaction was conducted for 10 h while introducing 2665 g (60.5 mol) of EO into the autoclave such that the inside pressure was adjusted to 0.1 to 0.4 MPa. Thereafter, the contents of the autoclave were cooled to 60° C., and then 2.0 g of glacial acetic acid (available from Kishida Chemical Co., Ltd.) was added thereto, followed by stirring the resulting mixture for 1 h, thereby obtaining 2770 g of polyoxyethylene 2-ethylhexyl ether (compound D-3). The average molar number of addition of EO was 60.

Synthesis Example 2

Synthesis of Compound D-4

The same procedure as in Synthesis Example 1 was repeated except that the amount of EO used was changed from 2665 g to 3546 g (80.5 mol) and the EO addition reaction was carried out for 12 h, thereby obtaining 3620 g of polyoxyethylene 2-ethylhexyl ether (compound D-4). The average molar number of addition of EO was 80.

Synthesis Example 3

Synthesis of Compound D-14

The same procedure as in Synthesis Example 2 was repeated except that 2-ethyl-1-hexanol was replaced with 262.4 g (0.97 mol) of 1-octadecanol (available from Wako Pure Chemical Industries, Ltd.) and the pressure upon removal of water was changed to 4.7 kPa, thereby obtaining 3760 g of polyoxyethylene stearyl ether (compound D-14). The average molar number of addition of EO was 80.

Synthesis Example 4

Synthesis of Compound D-15

A 6.0 L-capacity autoclave equipped with a stirrer and a temperature controller was charged with 524.8 g (1.94 mol) of 1-octadecanol (available from Wako Pure Chemical Industries, Ltd.) as a "raw material alcohol" and 7.01 g of a 48% by mass potassium hydroxide aqueous solution, and the inside atmosphere of the autoclave was replaced with nitrogen and then held at 110° C. under 4.7 kPa for 1.0 h to remove water therefrom. The inside pressure of the autoclave was returned to an atmospheric pressure by introducing nitrogen thereinto, and PO addition reaction was conducted for 24 h while introducing 1104 g (12.5 mol) of PO into the autoclave such that the inside pressure was adjusted to 0.1 to 0.45 MPa. Next, the contents of the autoclave were heated to 140° C. at which EO addition reaction was conducted for 6 h while introducing 1101 g (9.5 mol) of EO into the autoclave such that the inside pressure was adjusted to 0.1 to 0.4 MPa. Thereafter, the contents of the autoclave were cooled to 60° C., and then 4.0 g of glacial acetic acid (available from Kishida Chemical Co., Ltd.) was added thereto, followed by stirring the resulting mixture for 1 h, thereby obtaining 2700 g of polyoxyethylene/polyoxypropylene stearyl ether. The average molar number of addition of PO was 9, and the average molar number of addition of EO was 12.

Synthesis Example 5

Synthesis of Compound D-16

The same procedure as in Synthesis Example 3 was repeated except that 1-octadecanol was replaced with 1584.1 g (4.85 mol) of 1-docosanol (available from Tokyo Kasei Kogyo Co., Ltd.), the amounts of the 48% by mass potassium hydroxide aqueous solution and EO used were changed to 17.53 g and 1167 g (5.3 mol), respectively, the EO addition reaction was carried out for 6 h, and the amount of the glacial acetic acid used was changed to 10.0 g, thereby obtaining 2740 g of polyoxyethylene behenyl ether (compound D-16). The average molar number of addition of EO was 5.

Synthesis Example 6

Synthesis of Compound D-17

The same procedure as in Synthesis Example 5 was repeated except that the amounts of 1-docosanol, the 48% by mass potassium hydroxide aqueous solution and EO used were changed to 950.4 g (2.91 mol), 10.52 g and 2709 g (20.5 mol), respectively, the EU addition reaction was carried out for 10 h, and the amount of the glacial acetic acid used was changed to 6.0 g, thereby obtaining 3642 g of polyoxyethylene behenyl ether (compound D-17). The average molar number of addition of EU was 20.

Synthesis Example 7

Synthesis of Compound D-19

The same procedure as in Synthesis Example 5 was repeated except that the amounts of 1-docosanol, the 48% by mass potassium hydroxide aqueous solution and EO used were changed to 316.8 g (0.97 mol), 3.51 g and 3546 g (80.5 mol), respectively, the EO addition reaction was carried out for 20 h, and the amount of the glacial acetic acid used was changed to 2.0 g, thereby obtaining 3756 g of polyoxyethylene behenyl ether (compound D-19). The average molar number of addition of EO was 80.

The compounds used in the respective Examples and Comparative Examples are shown in Table 1.

TABLE 1

| Compound | Structure of $R^1$*[1] | Number of carbon atoms in $R^1$ | m*[1] | n*[1] | A*[1] | Active ingredients*[2] (% by mass) | Water*[3] (% by mass) | Other components*[4] (% by mass) | Maker | Tradename |
|---|---|---|---|---|---|---|---|---|---|---|
| D-1 | 2-Ethyl hexyl | 8 | 0 | 8 | H | 100 | 0 | 0 | Nippon Nyukazai Co., Ltd | NEWCOL 1008 |
| D-2 | 2-Ethyl hexyl | 8 | 0 | 20 | H | 100 | 0 | 0 | Nippon Nyukazai Co., Ltd | NEWCOL 1020 |
| D-3 | 2-Ethyl hexyl | 8 | 0 | 60 | H | 100 | 0 | 0 | — | Synthesized product |
| D-4 | 2-Ethyl hexyl | 8 | 0 | 80 | H | 100 | 0 | 0 | — | Synthesized product |
| D-5 | Lauryl | 12 | 0 | 6 | H | 100 | 0 | 0 | Kao Corporation | EMULGEN 108 |
| D-6 | Lauryl | 12 | 0 | 12 | H | 100 | 0 | 0 | Kao Corporation | EMULGEN 120 |
| D-7 | Lauryl | 12 | 0 | 47 | H | 100 | 0 | 0 | Kao Corporation | EMULGEN 150 |
| D-8 | Lauryl | 12 | 0 | 60 | H | 100 | 0 | 0 | DKS Co., Ltd. | DKS NL-600F |
| D-9 | Stearyl | 18 | 0 | 6 | H | 100 | 0 | 0 | Kao Corporation | EMULGEN 306P |
| D-10 | Stearyl | 18 | 0 | 10 | H | 100 | 0 | 0 | Aoki Oil Industrial Co., Ltd. | BLAUNON SR-710 |
| D-11 | Stearyl | 18 | 0 | 13 | H | 100 | 0 | 0 | Kao Corporation | EMULGEN 320P |
| D-12 | Stearyl | 18 | 0 | 30 | H | 100 | 0 | 0 | Aoki Oil Industrial Co., Ltd. | BLAUNON SR-730 |
| D-13 | Stearyl | 18 | 0 | 60 | H | 100 | 0 | 0 | Nippon Nyukazai Co., Ltd | NEWCOL 1860 |
| D-14 | Stearyl | 18 | 0 | 80 | H | 100 | 0 | 0 | — | Synthesized product |
| D-15 | Stearyl | 18 | 9 | 12 | H | 100 | 0 | 0 | — | Synthesized product |
| D-16 | Behenyl | 22 | 0 | 5 | H | 100 | 0 | 0 | — | Synthesized product |
| D-17 | Behenyl | 22 | 0 | 20 | H | 100 | 0 | 0 | — | Synthesized product |

TABLE 1-continued

| Compound | Structure of $R^{1*1}$ | Number of carbon atoms in $R^1$ | $m^{*1}$ | $n^{*1}$ | $A^{*1}$ | Active ingredients*2 (% by mass) | Water*3 (% by mass) | Other components*4 (% by mass) | Maker | Tradename |
|---|---|---|---|---|---|---|---|---|---|---|
| D-18 | Distyrenated phenyl | 22 | 0 | 20 | H | 100 | 0 | 0 | Kao Corporation | EMULGEN A-60 |
| D-19 | Behenyl | 22 | 0 | 80 | H | 100 | 0 | 0 | — | Synthesized product |
| D-20 | | | Sodium benzoate | | | 100 | 0 | 0 | Kanto Chemical Co., Inc. | Sodium benzoate |
| D-21 | Lauryl | 12 | 0 | 3 | —SO$_3$—Na+ | 26 | 72 | 2 | Kao Corporation | EMAL 20C |
| D-22 | Lauryl | 12 | 0 | 10 | —CH$_2$COO—Na+ | 24 | 76 | 0 | Kao Corporation | AKYPO RLM100NV |
| D-23 | Lauryl | 12 | 0 | 18 | —SO$_3$—Na+ | 22 | 74 | 4 | Kao Corporation | LATEMUL E-118B |
| D-24 | Lauryl | 12 | 0 | 19 | —PO$_3$H—NH$_3$C$_2$H$_4$OH+ | 25 | 72 | 3 | DKS Co., Ltd. | PLYSURF DB-02 |
| D-25 | Stearyl | 18 | 0 | 0 | —N(CH$_3$)$_3$+Cl— | 63 | 8 | 29 | Kao Corporation | QUARTAMIN 86P CONC |
| D-26 | Stearyl | 18 | 0 | 0 | —N+(CH$_3$)$_2$—CH$_2$COO— | 26 | 67 | 7 | Kao Corporation | AMPHITOL 86B |
| D-27 | Oleyl | 18 | 0 | 23 | —SO$_3$—Na+ | 26 | 68 | 6 | Kao Corporation | LEVENOL WX |
| D-28 | Distyrenated phenyl | 22 | 0 | 17 | —SO$_3$—NH$_4$+ | 95 | 1 | 4 | DKS Co., Ltd. | HITENOL NF-17 |

Note
*1$R^1$, n, m and A in the formula (1);
*2Content of compounds D-X (wherein X is 1 to 28) in commercially available products or synthesized products;
*3Content of water in commercially available products or synthesized products; and
*4Content of other components in commercially available products or synthesized products.

Examples 1 to 42 and Comparative Examples 1 to 22

(Kneading Step)

The following procedure was conducted as the step 1. That is, the raw material organic pigment, water-soluble inorganic salt and water-soluble organic solvent as shown in Tables 2 to 5 were kneaded together using a dispersion kneader "TD0.5-3M Model" available from Toshin Co., Ltd., without application of a pressure thereto at a rotating speed of 30 r/min for 0.5 h while maintaining the contents of the kneader at a temperature of from 40 to 60° C. Further, the compound (1), water and water-soluble basic compound as shown in Tables 2 to 5 were added to the kneader, and the contents of the kneader were kneaded under the same conditions as described above for 2.0 h.

(Cleaning Step)

The following procedure was conducted as the step 2. That is, the mixture obtained in the step 1 was added to 3000 g of water and stirred for 1 h. The resulting dispersion was fed under a pressure of 0.2 MPa into a chamber (filter chamber capacity: 763 cm$^3$; filtration area: 513 cm$^2$) of a filter press (Yabuta-type filter press) "ROUND TESTER YTO-8 Model" available from Yabuta Kikai Co., Ltd. Next, 50 L of water was fed under a pressure of 0.2 MPa into the chamber to remove the water-soluble inorganic salt and water-soluble organic solvent therefrom, and further the resulting material was pressed under a pressure of 0.4 MPa to thereby obtain a pigment paste.

(Drying Step)

The resulting pigment paste was dried at 70° C. for 24 h, and pulverized in an agate mortar to obtain a powder of a fine organic pigment.

Meanwhile, the raw material organic pigments, water-soluble inorganic salts, water-soluble organic solvents and water-soluble basic compounds used in the respective Examples and Comparative Examples as shown in Tables 2 to 5 as well as properties thereof are as follows.

[Raw Material Organic Pigment]
A-1: PR122 (2,9-dimethyl quinacridone; "CFR002" available from Dainichiseika Color & Chemicals Mfg. Co., Ltd.; primary particle size: 91 nm)
A-2: PV19 (unsubstituted quinacridone; "CFR0100" available from Dainichiseika Color & Chemicals Mfg. Co., Ltd.; primary particle size: 62 nm)
A-3: PR254 (diketopyrrolopyrrole; "B-CF" available from BASF; primary particle size: 70 nm)
A-4: PY155 (disazo pigment; "Ink Jet Yellow 4GC VP3854" available from Clariant Corporation; primary particle size: 130 nm)
A-5: PY180 (benzimidazolone; "Toner Yellow HG" available from Clariant Corporation; primary particle size: 125 nm)

[Water-Soluble Inorganic Salt]
B-1: Sodium chloride ("OSHIO MICRON T-0" available from Ako Kasei Co., Ltd.; average particle size: 10 μm)
B-2: Sodium chloride ("Guaranteed Sodium Chloride (reagent)" available from Kishida Chemical Co., Ltd.; average particle size: about 500 μm)

[Water-Soluble Organic Solvent]
C-1: Diethylene glycol ("Guaranteed" available from Wako Pure Chemical Industries, Ltd.)
C-2: Propylene glycol ("Guaranteed" available from Wako Pure Chemical Industries, Ltd.)

[Water-Soluble Basic Compound]
F-1: Sodium hydroxide

The evaluation results of the resulting fine organic pigments are shown in Tables 2 to 5. With respect to the primary particle of the respective fine organic pigments, when the primary particle was smaller than a primary particle of a control pigment prepared without compounding the compound (1) therein in the step 1, the fine organic pigment was evaluated to have a good atomization effect. Also, with respect to the filtration property of the respective fine organic pigments, when the filtration velocity retention rate was 92% or higher, the filtration property thereof was evaluated as being high.

TABLE 2

| | (A) Raw material organic pigment | | (B) Water-soluble inorganic salt | | (C) Water-soluble organic solvent | | (D) Compound (1) | | Primary particle size (nm) | Filtering property | |
|---|---|---|---|---|---|---|---|---|---|---|---|
| | | | | | | | | | | Filtration velocity (mL/min) | Filtration velocity retention rate (%) |
| | Kind | Amount added (g) | Kind | Amount added (g) | Kind | Amount added (g) | Kind | Part(s) by mass*[1] | | | |
| Example 1 | A-1 | 128 | B-1 | 638 | C-1 | 157 | D-2 | 5.0 | 56.5 | 625 | 99.0 |
| Example 2 | A-1 | 128 | B-1 | 638 | C-1 | 157 | D-3 | 5.0 | 56.8 | 628 | 99.5 |
| Example 3 | A-1 | 128 | B-1 | 638 | C-1 | 157 | D-6 | 5.0 | 55.9 | 601 | 95.2 |
| Example 4 | A-1 | 128 | B-1 | 638 | C-1 | 157 | D-7 | 5.0 | 55.0 | 620 | 98.3 |
| Example 5 | A-1 | 128 | B-1 | 638 | C-1 | 157 | D-8 | 5.0 | 56.3 | 626 | 99.2 |
| Example 6 | A-1 | 128 | B-1 | 638 | C-1 | 157 | D-10 | 5.0 | 56.2 | 602 | 95.4 |
| Example 7 | A-1 | 128 | B-1 | 638 | C-1 | 157 | D-11 | 5.0 | 54.8 | 614 | 97.3 |
| Example 8 | A-1 | 128 | B-1 | 638 | C-1 | 157 | D-12 | 5.0 | 54.5 | 610 | 96.7 |
| Example 9 | A-1 | 128 | B-1 | 638 | C-1 | 157 | D-13 | 5.0 | 55.3 | 612 | 97.0 |
| Example 10 | A-1 | 128 | B-1 | 638 | C-1 | 157 | D-17 | 5.0 | 56.4 | 594 | 94.1 |
| Example 11 | A-1 | 128 | B-1 | 638 | C-1 | 157 | D-18 | 5.0 | 56.6 | 583 | 92.4 |
| Example 12 | A-1 | 128 | B-1 | 638 | C-1 | 157 | D-12 | 1.0 | 56.7 | 621 | 98.4 |
| Example 13 | A-1 | 128 | B-1 | 638 | C-1 | 157 | D-12 | 2.5 | 55.5 | 613 | 97.1 |
| Example 14 | A-1 | 128 | B-1 | 638 | C-1 | 157 | D-12 | 12.0 | 55.4 | 609 | 96.5 |
| Example 15 | A-1 | 128 | B-1 | 638 | C-1 | 157 | D-12 | 15.0 | 56.3 | 600 | 95.1 |
| Example 16 | A-1 | 128 | B-1 | 638 | C-2 | 157 | D-12 | 5.0 | 54.8 | 602 | 96.3 |
| Example 17 | A-1 | 128 | B-1 | 638 | C-1 | 157 | D-15 | 5.0 | 54.8 | 600 | 95.1 |
| Comparative Example 1 | A-1 | 128 | B-1 | 638 | C-1 | 157 | — | — | 57.1 | 631 | 100.0 |
| Comparative Example 2 | A-1 | 128 | B-1 | 638 | C-1 | 157 | D-1 | 5.0 | 57.3 | 620 | 98.3 |
| Comparative Example 3 | A-1 | 128 | B-1 | 638 | C-1 | 157 | D-4 | 5.0 | 58.0 | 625 | 99.0 |
| Comparative Example 4 | A-1 | 128 | B-1 | 638 | C-1 | 157 | D-5 | 5.0 | 57.8 | 602 | 95.4 |
| Comparative Example 5 | A-1 | 128 | B-1 | 638 | C-1 | 157 | D-9 | 5.0 | 57.4 | 608 | 96.4 |
| Comparative Example 6 | A-1 | 128 | B-1 | 638 | C-1 | 157 | D-14 | 5.0 | 57.8 | 615 | 97.5 |
| Comparative Example 7 | A-1 | 128 | B-1 | 638 | C-1 | 157 | D-16 | 5.0 | 58.3 | 575 | 91.1 |
| Comparative Example 8 | A-1 | 128 | B-1 | 638 | C-1 | 157 | D-19 | 5.0 | 58.5 | 610 | 96.7 |
| Comparative Example 9 | A-1 | 128 | B-1 | 638 | C-1 | 157 | D-12 | 0.5 | 57.3 | 630 | 99.8 |
| Comparative Example 10 | A-1 | 128 | B-1 | 638 | C-1 | 157 | D-12 | 20.0 | 58.3 | 589 | 93.3 |
| Comparative Example 11 | A-1 | 128 | B-1 | 638 | C-2 | 157 | — | — | 57.3 | 625 | 100.0 |

Note
*[1]Amount (part(s) by mass,; based on active ingredients) compounded on the basis of 100 parts by mass of component (A).

TABLE 3-1

| | (A) Raw material organic pigment | | (B) Water-soluble inorganic salt | | (C) Water-soluble organic solvent | | (D) Compound (1) | |
|---|---|---|---|---|---|---|---|---|
| | Kind | Amount added (g) | Kind | Amount added (g) | Kind | Amount added (g) | Kind | Part(s) by mass*[1] |
| Example 22 | A-1 | 128 | B-1 | 638 | C-1 | 157 | D-22 | 5.0 |
| Example 23 | A-1 | 128 | B-1 | 638 | C-1 | 157 | D-23 | 5.0 |
| Example 24 | A-1 | 128 | B-1 | 638 | C-1 | 157 | D-24 | 5.0 |
| Example 25 | A-1 | 128 | B-1 | 638 | C-1 | 157 | D-27 | 5.0 |
| Example 26 | A-1 | 128 | B-1 | 638 | C-1 | 157 | D-28 | 5.0 |
| Example 27 | A-1 | 128 | B-1 | 638 | C-1 | 157 | D-27 | 1.0 |
| Example 28 | A-1 | 128 | B-1 | 638 | C-1 | 157 | D-27 | 2.5 |
| Example 29 | A-1 | 128 | B-1 | 638 | C-1 | 157 | D-27 | 12.0 |
| Example 30 | A-1 | 128 | B-1 | 638 | C-1 | 157 | D-27 | 15.0 |
| Example 31 | A-1 | 128 | B-1 | 638 | C-2 | 157 | D-27 | 5.0 |
| Example 32 | A-1 | 128 | B-2 | 638 | C-1 | 157 | D-27 | 5.0 |
| Comparative Example 1 | A-1 | 128 | B-1 | 638 | C-1 | 157 | — | — |
| Comparative Example 16 | A-1 | 128 | B-1 | 638 | C-1 | 157 | D-20 | 5.0 |
| Comparative Example 17 | A-1 | 128 | B-1 | 638 | C-1 | 157 | D-21 | 5.0 |
| Comparative Example 18 | A-1 | 128 | B-1 | 638 | C-1 | 157 | D-25 | 5.0 |

TABLE 3-1-continued

| | (A) Raw material organic pigment | | (B) Water-soluble inorganic salt | | (C) Water-soluble organic solvent | | (D) Compound (1) | |
|---|---|---|---|---|---|---|---|---|
| | Kind | Amount added (g) | Kind | Amount added (g) | Kind | Amount added (g) | Kind | Part(s) by mass*1 |
| Comparative Example 19 | A-1 | 128 | B-1 | 638 | C-1 | 157 | D-26 | 5.0 |
| Comparative Example 20 | A-1 | 128 | B-1 | 638 | C-1 | 157 | D-27 | 0.5 |
| Comparative Example 21 | A-1 | 128 | B-1 | 638 | C-1 | 157 | D-27 | 20.0 |
| Comparative Example 11 | A-1 | 128 | B-1 | 638 | C-2 | 157 | — | — |
| Comparative Example 22 | A-1 | 128 | B-2 | 638 | C-1 | 157 | — | — |

Note
*1Amount (part(s) by mass; based on active ingredients) compounded on the basis of 100 parts by mass of component (A).

TABLE 3-2

| | (E) Water | | | Filtering property | |
|---|---|---|---|---|---|
| | Amount added (g)*3 | Part(s) by mass*2 | Primary particle size (nm) | Filtration velocity (mL/min) | Filtration velocity retention rate (%) |
| Example 22 | 20.2 | 3.2 | 56.8 | 598 | 94.8 |
| Example 23 | 21.5 | 3.4 | 53.8 | 606 | 96.0 |
| Example 24 | 18.4 | 2.9 | 54.9 | 620 | 98.3 |
| Example 25 | 16.7 | 2.6 | 54.3 | 621 | 98.4 |
| Example 26 | 0.1 | 0.0 | 53.8 | 589 | 93.3 |
| Example 27 | 3.3 | 0.5 | 56.4 | 628 | 99.5 |
| Example 28 | 8.3 | 1.3 | 54.8 | 623 | 98.7 |
| Example 29 | 40.0 | 6.3 | 55.7 | 598 | 94.8 |
| Example 30 | 50.1 | 7.8 | 56.7 | 591 | 93.7 |
| Example 31 | 16.7 | 2.6 | 54.8 | 616 | 98.6 |
| Example 32 | 16.7 | 2.6 | 56.5 | 618 | 98.9 |
| Comparative Example 1 | — | — | 57.1 | 631 | 100.0 |
| Comparative Example 16 | — | — | 57.1 | 621 | 98.4 |
| Comparative Example 17 | 17.7 | 2.8 | 58.0 | 498 | 78.9 |
| Comparative Example 18 | 0.8 | 0.1 | 59.8 | 628 | 99.5 |
| Comparative Example 19 | 16.4 | 2.6 | 58.4 | 589 | 93.3 |
| Comparative Example 20 | 1.7 | 0.3 | 57.2 | 633 | 100.3 |
| Comparative Example 21 | 66.7 | 10.5 | 57.8 | 580 | 91.9 |
| Comparative Example 11 | — | — | 57.3 | 625 | 100.0 |
| Comparative Example 22 | — | — | 60.3 | 629 | 100.0 |

Note
*2Amount (part(s) by mass) compounded on the basis of 100 parts by mass of component (B); and
*3Amount (g) of water brought into mixture from (D) compound (1).

TABLE 4-1

| | (A) Raw material organic pigment | | (B) Water-soluble inorganic salt | | (C) Water-soluble organic solvent | | (D) Compound (1) | |
|---|---|---|---|---|---|---|---|---|
| | Kind | Amount added (g) | Kind | Amount added (g) | Kind | Amount added (g) | Kind | Part(s) by mass*1 |
| Comparative Example 1 | A-1 | 128 | B-1 | 638 | C-1 | 157 | — | — |
| Example 8 | A-1 | 128 | B-1 | 638 | C-1 | 157 | D-12 | 5.0 |
| Example 25 | A-1 | 128 | B-1 | 638 | C-1 | 157 | D-27 | 5.0 |

TABLE 4-1-continued

|  | (A) Raw material organic pigment | | (B) Water-soluble inorganic salt | | (C) Water-soluble organic solvent | | (D) Compound (1) | |
|---|---|---|---|---|---|---|---|---|
|  | Kind | Amount added (g) | Kind | Amount added (g) | Kind | Amount added (g) | Kind | Part(s) by mass*[1] |
| Comparative Example 12 | A-2 | 128 | B-1 | 638 | C-1 | 157 | — | — |
| Example 18 | A-2 | 128 | B-1 | 638 | C-1 | 157 | D-12 | 5.0 |
| Example 33 | A-2 | 128 | B-1 | 638 | C-1 | 157 | D-27 | 5.0 |
| Comparative Example 13 | A-3 | 128 | B-1 | 638 | C-1 | 157 | — | — |
| Example 19 | A-3 | 128 | B-1 | 638 | C-1 | 157 | D-12 | 5.0 |
| Example 34 | A-3 | 128 | B-1 | 638 | C-1 | 157 | D-27 | 5.0 |
| Comparative Example 14 | A-4 | 128 | B-1 | 638 | C-1 | 157 | — | — |
| Example 20 | A-4 | 128 | B-1 | 638 | C-1 | 157 | D-12 | 5.0 |
| Example 35 | A-4 | 128 | B-1 | 638 | C-1 | 157 | D-27 | 5.0 |
| Comparative Example 15 | A-5 | 128 | B-1 | 638 | C-1 | 157 | — | — |
| Example 21 | A-5 | 128 | B-1 | 638 | C-1 | 157 | D-12 | 5.0 |
| Example 36 | A-5 | 128 | B-1 | 638 | C-1 | 157 | D-27 | 5.0 |

Note
*[1]Amount (part(s) by mass; based on active ingredients) compounded on the basis of 100 parts by mass of component (A).

TABLE 4-2

|  | (E) Water | | | Filtering property | |
|---|---|---|---|---|---|
|  | Amount added (g) | Part(s) by mass*[2] | Primary particle size (nm) | Filtration velocity (mL/min) | Filtration velocity retention rate (%) |
| Comparative Example 1 | — | — | 57.1 | 631 | 100.0 |
| Example 8 | — | — | 54.5 | 610 | 96.7 |
| Example 25 | *3(16.7) | 2.6 | 54.3 | 621 | 98.4 |
| Comparative Example 12 | — | — | 51.2 | 610 | 100.0 |
| Example 18 | — | — | 48.5 | 598 | 98.0 |
| Example 33 | *3(16.7) | 2.6 | 46.0 | 598 | 98.0 |
| Comparative Example 13 | — | — | 45.5 | 594 | 100.0 |
| Example 19 | — | — | 43.5 | 579 | 97.5 |
| Example 34 | *3(16.7) | 2.6 | 41.2 | 579 | 97.5 |
| Comparative Example 14 | — | — | 68.1 | 600 | 100.0 |
| Example 20 | — | — | 61.1 | 577 | 96.2 |
| Example 35 | *3(16.7) | 2.6 | 58.9 | 577 | 96.2 |
| Comparative Example 15 | — | — | 70.5 | 620 | 100.0 |
| Example 21 | — | — | 63.6 | 589 | 95.0 |
| Example 36 | *3(16.7) | 2.6 | 60.6 | 589 | 95.0 |

Note
*[2]Amount (part(s) by mass) compounded on the basis of 100 parts by mass of component (B); and
*3Amount (g) of water brought into mixture from (D) compound (1).

TABLE 5-1

|  | (A) Raw material organic pigment | | (B) Water-soluble inorganic salt | | (C) Water-soluble organic solvent | | (D) Compound (1) | |
|---|---|---|---|---|---|---|---|---|
|  | Kind | Amount added (g) | Kind | Amount added (g) | Kind | Amount added (g) | Kind | Part(s) by mass*[1] |
| Example 37 | A-1 | 128 | B-1 | 638 | C-1 | 157 | D-12 | 5.0 |
| Example 38 | A-1 | 128 | B-1 | 638 | C-1 | 157 | D-27 | 5.0 |
| Example 39 | A-2 | 128 | B-1 | 638 | C-1 | 157 | D-12 | 5.0 |
| Example 40 | A-2 | 128 | B-1 | 638 | C-1 | 157 | D-27 | 5.0 |
| Example 41 | A-3 | 128 | B-1 | 638 | C-1 | 157 | D-12 | 5.0 |
| Example 42 | A-3 | 128 | B-1 | 638 | C-1 | 157 | D-27 | 5.0 |

Note
*[1]Amount (part(s) by mass; based on active ingredients) compounded on the basis of 100 parts by mass of component

TABLE 5-2

|  | (E) Water | | (F) Water-soluble basic compound | | | (F)/(E + F) | Filtering property | | |
|---|---|---|---|---|---|---|---|---|---|
|  | | | | | | | Primary | Filtration | Filtration velocity |
|  | Amount added (g) | Part(s) by mass*² | Kind | Amount added (g) | Part(s) by mass*¹ | (% by mass) | particle size (nm) | velocity (mL/min) | retention rate (%) |
| Example 37 | 10.2 | 1.6 | F-1 | 9.5 | 7.4 | 48 | 33.5 | 612 | 97.0 |
| Example 38 | *3(16.7) | 2.6 | F-1 | 15.4 | 12.1 | 48 | 34.2 | 619 | 98.1 |
| Example 39 | 10.2 | 1.6 | F-1 | 9.5 | 7.4 | 48 | 32.0 | 600 | 98.4 |
| Example 40 | *3(16.7) | 2.6 | F-1 | 15.4 | 12.1 | 48 | 33.8 | 597 | 97.9 |
| Example 41 | 10.2 | 1.6 | F-1 | 9.5 | 7.4 | 48 | 28.2 | 583 | 98.1 |
| Example 42 | *3(16.7) | 2.6 | F-1 | 15.4 | 12.1 | 48.1 | 28.6 | 577 | 97.1 |

Note
*¹Amount (part(s) by mass; based on active ingredients) compounded on the basis of 100 parts by mass of component
*²Amount (part(s) by mass) compounded on the basis of 100 parts by mass of component (B); and
*3Amount (g) of water brought into mixture from (D) compound (1).

From Tables 2 and 3, it was confirmed that the fine organic pigments obtained in Examples 1 to 15, 17 and 22 to 30 had a smaller primary particle size and a higher filtering property than those of the fine organic pigment obtained in Comparative Example 1. Similarly, it was confirmed that the fine organic pigments obtained in Examples 16 and 31 had a smaller primary particle size and a higher filtering property than those of the fine organic pigment obtained in Comparative Example 11, and the fine organic pigment obtained in Example 32 had a smaller primary particle size and a higher filtering property than those of the fine organic pigment obtained in Comparative Example 22.

In addition, from Table 4, it was confirmed that the fine organic pigments obtained in Examples 18 and 33 had a smaller primary particle size and a higher filtering property than those of the fine organic pigment obtained in Comparative Example 12; the fine organic pigments obtained in Examples 19 and 34 had a smaller primary particle size and a higher filtering property than those of the fine organic pigment obtained in Comparative Example 13; the fine organic pigments obtained in Examples 20 and 35 had a smaller primary particle size and a higher filtering property than those of the fine organic pigment obtained in Comparative Example 14; and the fine organic pigments obtained in Examples 21 and 36 had a smaller primary particle size and a higher filtering property than those of the fine organic pigment obtained in Comparative Example 15. From the aforementioned results, it was recognized that according to the process for producing the fine organic pigment including the steps 1 and 2, it was possible to obtain the fine organic pigments having a very small primary particle size and exhibiting high filtering property even upon the cleaning step, and therefore produce the fine organic pigments with high productivity.

According to the results shown in Table 5, from the comparison between Example 37 and Example 8, between Example 38 and Example 25, between Example 39 and Example 18, between Example 40 and Example 33, between Example 41 and Example 19, and between Example 42 and Example 34, it was confirmed that the pigments prepared by compounding water and the water-soluble basic compound therein had a smaller primary particle size and were similarly excellent in filtering property as compared to the pigments prepared without compounding these materials therein. From these results, it was recognized that not only even when A of the compound (1) was a hydrogen atom, i.e., the nonionic surfactant was used, but also even when A of the compound (1) was an anionic group, i.e., the anionic surfactant was used, the pigments obtained by using water in combination with the water-soluble basic compound had a reduced primary particle size and an excellent filtering property.

Example 43 to 48, 55 and 57

Preparation of Water Dispersions (Preparation of Pigment Pastes 1 to 6, 13 and 15)

The same procedure as in the step 1 (kneading step) and the step 2 (cleaning step) of Example 1 was conducted except for using the raw material organic pigments, water-soluble inorganic salts, water-soluble organic solvents, the compound (1), water and water-soluble basic compounds as shown in Table 6, thereby obtaining pigment pastes as shown in Table 6.

(Preparation of Water Dispersions 1 to 6, 13 and 15)

A mixed solution containing 41.7 g of a styrene-acrylic acid-based polymer ("Joncryl 68" available from BASF; hereinafter also referred to as "J68") and 113.4 g of MEK was mixed with 20.5 g of a 5N sodium hydroxide aqueous solution, and the pigment paste and ion-exchanged water as shown in "Preparation of Water Dispersion" in Table 6, to prepare a mixture thereof. The resulting mixture was mixed using a disper blade at 20° C. at a rotating speed of 7000 rpm for 1 h, and further subjected to dispersing treatment by passing through "MICROFLUIDIZER" available from Microfluidics Corp., 10 times under a pressure of 150 MPa. The resulting dispersion was held under reduced pressure at 60° C. to remove MEK therefrom, and subjected to filtration through a filter (available from Fujifilm Corporation; acetyl cellulose membrane; pore size: 5 μm), thereby obtaining water dispersions 1 to 6, 13 and 15 as shown in Table 6.

Example 49 to 54, 56 and 58

Preparation of Water Dispersions (Preparation of Pigment Pastes 7 to 12, 14 and 16)

The following procedure was conducted as the step 1. That is, the raw material organic pigment, water-soluble inorganic salt and water-soluble organic solvent as shown in Table 6 were kneaded together using a pressure-type kneader "TD0.5-3M Model" available from Toshin Co., Ltd., without application of a pressure thereto at a rotating speed of 30 r/min for 0.5 h while maintaining the contents of the kneader at a temperature of from 40 to 60° C. Further, the compound (1) was added in such an amount as shown in Table 6 to the kneader, and the contents of the kneader were kneaded under the same conditions as described above for 2.0 h. Furthermore, a mixed solution of 42.5 g of J68 and 99.2 g of DEG was added to the kneader, and the contents of the kneader were kneaded under the same conditions as described above for 1.0 h. The resulting mixture was subjected to the same procedure as in the step 2 (cleaning step) of Example 1, thereby obtaining pigment pastes 7 to 12, 14 and 16 as shown in Table 6.

(Preparation of Water Dispersions 7 to 12, 14 and 16)

A mixture containing 113.4 g of MEK, 20.5 g of a 5N sodium hydroxide aqueous solution, and the pigment paste and ion-exchanged water as shown in "Preparation of Water Dispersion" of Table 6, was prepared. The resulting mixture was mixed using a disper blade at 20° C. at a rotating speed of 7000 rpm for 1 h, and further subjected to dispersing treatment by passing through "MICROFLUIDIZER" available from Microfluidics Corp., 10 times under a pressure of 150 MPa. The resulting dispersion was held under reduced pressure at 60° C. to remove MEK therefrom, and subjected to filtration through a filter (available from Fujifilm Corporation; acetyl cellulose membrane; pore size: 5 μm), thereby obtaining water dispersions 7 to 12, 14 and 16 as shown in Table 6.

Examples 43 to 58

Preparation of Inks (Preparation of Ink Solvent)

Four grams (4.0 g) of 1,2-hexanediol (available from Tokyo Kasei Kogyo Co., Ltd.), 6.0 g of 2-pyrrolidone (available from Wako Pure Chemical Industries Ltd.), 15.0 g of glycerol (available from Kao Corporation), 4.0 g of triethylene glycol monobutyl ether ("Butyl Triglycol" available from Nippon Nyukazai Co., Ltd.), 0.5 g of an acetylene glycol-based surfactant "SURFYNOL 465" (available from Nissin Chemical Industry Co., Ltd.), 0.5 g of an acetylene glycol-based surfactant "OLFINE E1010" (available from Nissin Chemical Industry Co., Ltd.), 0.3 g of an antiseptic agent "Ploxel XL2" (available from Avecia K.K.) and 29.7 g of ion-exchanged water were uniformly mixed with each other, thereby preparing an ink solvent (hereinafter also referred to as a "vehicle").

(Preparation of Inks 1 to 16)

While stirring 40 g of each of the water dispersions 1 to 16 as shown in Table 6, 60 g of the vehicle was added and mixed therein, and the resulting mixture was subjected to filtration through a filter (available from Fujifilm Corporation; acetyl cellulose membrane; pore size: 1.2 μm), thereby obtaining inks 1 to 16.

The evaluation results of the resulting inks 1 to 16 are shown in Table 6.

TABLE 6-1

| | (A) Raw material organic pigment | | (B) Water-soluble inorganic salt | | (C) Water-soluble organic solvent | | (D) Compound (1) | |
|---|---|---|---|---|---|---|---|---|
| | Kind | Amount added (g) | Kind | Amount added (g) | Kind | Amount added (g) | Kind | Part(s) by mass*[1] |
| Example 43 | A-1 | 128 | B-1 | 638 | C-1 | 157 | D-2 | 5.0 |
| Example 49 | A-1 | 128 | B-1 | 638 | C-1 | 157 | D-2 | 5.0 |
| Example 44 | A-1 | 128 | B-1 | 638 | C-1 | 157 | D-7 | 5.0 |
| Example 50 | A-1 | 128 | B-1 | 638 | C-1 | 157 | D-7 | 5.0 |
| Example 45 | A-1 | 128 | B-1 | 638 | C-1 | 157 | D-12 | 5.0 |
| Example 55 | A-1 | 128 | B-1 | 638 | C-1 | 157 | D-12 | 5.0 |
| Example 51 | A-1 | 128 | B-1 | 638 | C-1 | 157 | D-12 | 5.0 |
| Example 56 | A-1 | 128 | B-1 | 638 | C-1 | 157 | D-12 | 5.0 |
| Example 46 | A-1 | 128 | B-1 | 638 | C-1 | 157 | D-18 | 5.0 |
| Example 52 | A-1 | 128 | B-1 | 638 | C-1 | 157 | D-18 | 5.0 |
| Example 47 | A-1 | 128 | B-1 | 638 | C-1 | 157 | D-27 | 5.0 |
| Example 57 | A-1 | 128 | B-1 | 638 | C-1 | 157 | D-27 | 5.0 |
| Example 53 | A-1 | 128 | B-1 | 638 | C-1 | 157 | D-27 | 5.0 |
| Example 58 | A-1 | 128 | B-1 | 638 | C-1 | 157 | D-27 | 5.0 |
| Example 48 | A-1 | 128 | B-1 | 638 | C-1 | 157 | D-28 | 5.0 |
| Example 54 | A-1 | 128 | B-1 | 638 | C-1 | 157 | D-28 | 5.0 |

Note

*[1]Amount (part(s) by mass; based on active ingredients) compounded on the basis of 100 parts by mass of component (A).

TABLE 6-2

| | (E) Water | | (F) Water-soluble basic compound | | | (F)/(E + F) | Pigment paste | |
|---|---|---|---|---|---|---|---|---|
| | Amount added (g) | Part(s) by mass*[2] | Kind | Amount added (g) | Part(s) by mass*[1] | (% by mass) | No. | Solid content (% by mass) |
| Example 43 | — | — | — | — | — | — | 1 | 25 |
| Example 49 | — | — | — | — | — | — | 7 | 25 |
| Example 44 | — | — | — | — | — | — | 2 | 24 |
| Example 50 | — | — | — | — | — | — | 8 | 24 |

TABLE 6-2-continued

|  | (E) Water | | (F) Water-soluble basic compound | | | (F)/(E + F) | Pigment paste | |
|---|---|---|---|---|---|---|---|---|
|  | Amount added (g) | Part(s) by mass*2 | Kind | Amount added (g) | Part(s) by mass*1 | (% by mass) | No. | Solid content (% by mass) |
| Example 45 | — | — | — | — | — | — | 3 | 26 |
| Example 55 | 10.2 | 1.6 | F-1 | 9.5 | 7.4 | 48 | 13 | 23 |
| Example 51 | — | — | — | — | — | — | 9 | 26 |
| Example 56 | 10.2 | 1.6 | F-1 | 9.5 | 7.4 | 48 | 14 | 24 |
| Example 46 | — | — | — | — | — | — | 4 | 25 |
| Example 52 | — | — | — | — | — | — | 10 | 25 |
| Example 47 | — | — | — | — | — | — | 5 | 24 |
| Example 57 | *3(16.7) | 2.6 | F-1 | 15.4 | 12.1 | 48 | 15 | 25 |
| Example 53 | — | — | — | — | — | — | 11 | 24 |
| Example 58 | *3(16.7) | 2.6 | F-1 | 15.4 | 12.1 | 48 | 16 | 26 |
| Example 48 | — | — | — | — | — | — | 6 | 27 |
| Example 54 | — | — | — | — | — | — | 12 | 27 |

Note
*1Amount (part(s) by mass; based on active ingredients) compounded on the basis of 100 parts by mass of component
*2Amount (part(s) by mass) compounded on the basis of 100 parts by mass of component (B); and
*3Amount (g) of water brought into mixture from (D) compound (1).

TABLE 6-3

| | Water dispersion | | | | Ink | | |
|---|---|---|---|---|---|---|---|
| | No. | Pigment paste (g) | Ion-exchanged water (g) | Solid content (% by mass) | Time of addition of polymer*4 | No. | Particle size (nm) | Gloss (20°) |
| Example 43 | 1 | 500 | 175.1 | 20 | a | 1 | 107 | 38 |
| Example 49 | 7 | 667 | 50.1 | 20 | b | 7 | 96 | 49 |
| Example 44 | 2 | 521 | 154.2 | 20 | a | 2 | 103 | 39 |
| Example 50 | 8 | 694 | 22.3 | 20 | b | 8 | 94 | 50 |
| Example 45 | 3 | 481 | 194.3 | 20 | a | 3 | 101 | 43 |
| Example 55 | 13 | 522 | 153.6 | 20 | a | 13 | 83 | 61 |
| Example 51 | 9 | 641 | 75.7 | 20 | b | 9 | 91 | 55 |
| Example 56 | 14 | 694 | 22.6 | 20 | b | 14 | 56 | 76 |
| Example 46 | 4 | 500 | 175.1 | 20 | a | 4 | 103 | 40 |
| Example 52 | 10 | 667 | 50.1 | 20 | b | 10 | 93 | 53 |
| Example 47 | 5 | 521 | 154.2 | 20 | a | 5 | 102 | 44 |
| Example 57 | 15 | 500 | 175.3 | 20 | a | 15 | 85 | 58 |
| Example 53 | 11 | 694 | 22.3 | 20 | b | 11 | 89 | 59 |
| Example 58 | 16 | 641 | 75.7 | 20 | b | 16 | 59 | 74 |
| Example 48 | 6 | 463 | 212.1 | 20 | a | 6 | 99 | 43 |
| Example 54 | 12 | 617 | 99.4 | 20 | b | 12 | 87 | 58 |

Note
*4"a" represents that the polymer was added upon preparation of water dispersion, and "b" represents that the polymer was added upon preparation of pigment paste.

As shown in Examples 43 to 48, it was recognized that when producing the water-based ink using the pigment paste obtained by the process for producing the fine organic pigment including the steps 1 and 2, it was possible to obtain the ink having a fine particle size and an excellent gloss. Further, as shown in Examples 49 to 54, it was recognized that when producing the water-based ink using the pigment paste obtained by adding the polymer in the step 1 and further kneading the resulting mixture, it was possible to obtain the ink having a much finer particle size and a more excellent gloss. In addition, as shown in Examples 55 to 58, it was recognized that when producing the water-based ink using the pigment paste obtained by adding water and the water-soluble basic compound in the step 1 and further kneading the resulting mixture, it was possible to obtain the ink having a still finer particle size and a still more excellent gloss.

INDUSTRIAL APPLICABILITY

The present invention provides a useful process for producing a fine organic pigment that is usable in the applications such as inks for ink-jet printing and color filters.

The invention claimed is:
1. A process for producing a fine organic pigment, comprising the following steps 1 and 2:
step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass, on the basis of 100 parts by mass of the raw material organic pigment:

$$R^1O(PO)_m(EO)_nA \qquad (1)$$

wherein R¹ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n, (m +n), is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration, wherein the step 1 comprises the following steps 1-1 and 1-2:

step 1-1: mixing the raw material organic pigment, particles of the water-soluble inorganic salt and the water-soluble organic solvent with each other; and step 1-2: kneading a mixture comprising the mixture obtained in the step 1-1 and the compound represented by the formula (1).

2. The process according to claim 1, wherein a ratio of m to a sum of m and n, m/(m +n), is not less than 0 and not more than 0.5.

3. The process according to claim 1, wherein R¹ is an aliphatic hydrocarbon group.

4. The process according to claim 1, wherein $X^+$ is $Na^+$, $K^+$ or $NH_4^+$.

5. The process according to claim 1, wherein in the step 1,
water is further compounded in an amount of not less than 0.6 part by mass and not more than 10 parts by mass on the basis of 100 parts by mass of the water-soluble inorganic salt.

6. The process according to claim 1, wherein in the step 1,
a water-soluble basic compound is further compounded in an amount of not less than 1.5 parts by mass and not more than 35 parts by mass on the basis of 100 parts by mass of the raw material organic pigment.

7. The process according to claim 1, wherein the step 1 comprises the following steps 1-1 and 1-2:

step 1-1: mixing the raw material organic pigment, particles of the water-soluble inorganic salt and the water-soluble organic solvent with each other; and step 1-2: kneading a mixture comprising the mixture obtained in the step 1-1, the compound represented by the formula (1) and at least one material as an optionally compounded component selected from the group consisting of water and the water-soluble basic compound.

8. The process according to claim 1, wherein the water-soluble inorganic salt is at least one compound selected from the group consisting of an alkali metal chloride and an alkali metal sulfate.

9. The process according to claim 1, wherein the water-soluble organic solvent is an aliphatic compound comprising not less than 1 and not more than 3 alcoholic hydroxyl groups.

10. A process for producing a dispersion, comprising the step of dispersing a fine organic pigment produced by the process according to claim 1 and a solvent.

11. A process for producing an ink, comprising the step of dispersing a fine organic pigment produced by the process according to claim 1 and a solvent.

12. A process for producing a paste of a fine organic pigment, comprising the following steps 1 and 2:

step 1: kneading a mixture prepared by compounding a raw material organic pigment, a water-soluble inorganic salt, a water-soluble organic solvent and a compound represented by the following formula (1) with each other, the compound being compounded in an amount of not less than 0.8 part by mass and not more than 18.0 parts by mass, on the basis of 100 parts by mass of the raw material organic pigment:

$$R^1O(PO)_m(EO)_nA \qquad (1)$$

wherein R¹ is a hydrocarbon group having not less than 8 and not more than 24 carbon atoms; PO is propyleneoxide; EO is ethyleneoxide; m represents an average molar number of addition of propyleneoxide and is a number of not less than 0 and not more than 30, and n represents an average molar number of addition of ethyleneoxide and is a number of not less than 10 and not more than 70, with the proviso that a sum of m and n, (m +n), is not less than 10 and not more than 70; and A is a hydrogen atom, $-SO_3^-X^+$, $-PO_3H^-X^+$ or $-CH_2COO^-X^+$ wherein $X^+$ is a monovalent cation, in which when both PO and EO are present, these constituents may be arranged in any optional order; and step 2: subjecting the mixture obtained in the step 1 to cleaning treatment with an aqueous solvent and then to filtration, wherein the step 1 comprises the following steps 1-1 and 1-2:

step 1-1: mixing the raw material organic pigment, particles of the water-soluble inorganic salt and the water-soluble organic solvent with each other; and step 1-2: kneading a mixture comprising the mixture obtained in the step 1-1 and the compound represented by the formula (1).

13. The process for producing a paste of a fine organic pigment according to claim 12, wherein in the step 1,
water is further compounded in an amount of not less than 0.6 part by mass and not more than 10 parts by mass on the basis of 100 parts by mass of the water-soluble inorganic salt.

14. The process for producing a paste of a fine organic pigment according to claim 12, wherein in the step 1,
a water-soluble basic compound is further compounded in an amount of not less than 1.5 parts by mass and not more than 35 parts by mass on the basis of 100 parts by mass of the raw material organic pigment.

15. The process for producing a paste of a fine organic pigment according to claim 12, further comprising
kneading the kneaded mixture obtained in the step 1, with a polymer, wherein the step 2 is a step of cleaning the kneaded mixture obtained thereby.

16. A process for producing a dispersion, comprising subjecting the paste of the fine organic pigment produced by the process according to claim 12, an organic solvent, and water to dispersing treatment.

17. A process for producing an ink, comprising
mixing the dispersion produced by the process according to claim 16 with at least one material selected from the group consisting of water and an organic solvent.

* * * * *